United States Patent
Kamo et al.

(10) Patent No.: US 6,759,460 B2
(45) Date of Patent: Jul. 6, 2004

(54) RESIN COMPOSITION

(75) Inventors: Hiroshi Kamo, Sodegaura (JP); Shingo Kuga, Chiba (JP); Takashi Ono, Yokohama (JP); Masanori Ikeda, Fuji (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/086,852

(22) Filed: Mar. 4, 2002

(65) Prior Publication Data

US 2002/0193533 A1 Dec. 19, 2002

(30) Foreign Application Priority Data

Mar. 8, 2001 (JP) .......................................... 2001-064678
Sep. 6, 2001 (JP) .......................................... 2001-270006

(51) Int. Cl.[7] .............................. C08K 5/34; C08K 5/52; C08G 65/48
(52) U.S. Cl. ....................... 524/100; 524/127; 524/389; 524/399; 524/400; 524/492; 525/397; 525/437
(58) Field of Search ................................. 524/100, 127, 524/389, 399, 400, 492; 525/397, 437

(56) References Cited

U.S. PATENT DOCUMENTS

| 4,386,174 A | 5/1983 | Cogswell et al. |
| 4,433,083 A | 2/1984 | Cogswell et al. |
| 4,438,236 A | 3/1984 | Cogswell et al. |
| 5,006,403 A | 4/1991 | Isayev |
| 5,278,254 A | 1/1994 | Furuta et al. |
| 5,484,867 A | 1/1996 | Lichtenhan et al. |
| 5,997,765 A * | 12/1999 | Furuta et al. .......... 252/299.01 |
| 6,322,882 B1 * | 11/2001 | Moritomi ..................... 428/220 |
| 6,432,323 B1 * | 8/2002 | Maeda et al. .......... 252/299.01 |
| 6,518,336 B1 * | 2/2003 | Yabuhara et al. ........... 524/116 |

FOREIGN PATENT DOCUMENTS

| DE | 3644208 C2 | 7/1987 |
| EP | 0747437 A2 | 11/1996 |
| EP | 07554531 A1 | 1/1997 |
| EP | 0 997 495 A2 | 5/2000 |
| WO | W) 99/002607 A2 | 1/1999 |
| WO | WO 01/081471 A1 | 11/2001 |

OTHER PUBLICATIONS

Rusty L. Blanski et al., Nanocomposites 2001, (Jun. 25–27, 2001).

* cited by examiner

Primary Examiner—Kriellon A. Sanders
(74) Attorney, Agent, or Firm—Birch, Stewart, Kolasch & Birch, LLP

(57) ABSTRACT

The present invention relates to a novel resin composition which is excellent in the balance of impact resistance, chemical resistance and fluidity as well as heat resistance and flame retardancy, and to a method for obtaining the composition. Particularly, it relates to a resin composition comprising:

(A) 70 to 99 parts by weight of a polyphenylene ether resin, and (B) 1 to 30 parts by weight of a liquid-crystal polyester, wherein the polyphenylene ether resin in the composition contains 10 to 30 wt. % of polymer having a molecular weight of 20,000 or less and has a molecular weight distribution (Mw/Mn) of 1.8 to 3.5.

22 Claims, No Drawings

RESIN COMPOSITION

BACKGROUND OF THE INVENTION

1. Field of the Invention

The present invention relates to a novel resin composition which is excellent in the balance of impact resistance, chemical resistance and fluidity as well as heat resistance and flame retardancy, and to a method for obtaining the composition.

2. Prior Art

In general, polyphenylene ethers are resins that have excellent properties, for example, heat resistance, hot water resistance, size stability and mechanical and electrical properties, but are accompanied with drawbacks such as poor moldability owing to their high melt viscosity, bad chemical resistance and low impact resistance. With a view to improving such defects of polyphenylene ethers, methods of alloying and modifying polyphenylene ethers have conventionally been conducted.

It is well-known that adding polystyrene to the polyphenylene ethers improves the fluidity of the compositions. However, there are problems, which are, for example, that adding polystyrene impairs the heat resistance and chemical resistance.

As a technique related to alloying of a polyphenylene ether with another resin, for example, JP-A-56-115357 and EP-A-30417 proposed a process of mixing polymers, for example, a polyphenylene ether and a liquid-crystal polyester, thereby improving the melt processability of the polyphenylene ether. This process, however, is not sufficient to improve the impact resistance, chemical resistance and fluidity. JP-A-2-97555 proposed a process of mixing a polyphenylene ether with a liquid-crystal polyester in order to improve solder heat resistance, while JP-A-6-122762 and U.S. Pat. No. 5,498,689 proposed a process of mixing an amine-modified polyphenylene ether with a liquid-crystal polyester. Neither process is sufficient for a balance of impact resistance, chemical resistance, fluidity, heat resistance and flame retardancy. U.S. Pat. No. 5,006,403 proposed a polyphenylene ether resin composition containing fibrillated liquid-crystal polymers which form disperse phases in a continuous phase so as to reinforce the composition. WO 9902607 proposed a composition, which comprises a polyphenylene ether resin and a liquid-crystal polymer with a certain morphology. Neither process is sufficient for a balance of impact resistance, chemical resistance and fluidity.

SUMMARY OF THE INVENTION

An object of the invention is to provide a resin composition which can simultaneously attain excellent impact resistance, chemical resistance, fluidity, heat resistance and flame retardancy, especially very excellent impact resistance, chemical resistance and fluidity.

To achieve the object mentioned above, the present inventors carried out extensive investigations. As a result, it was found that a resin composition capable of simultaneously attaining impact resistance, chemical resistance, fluidity, heat resistance and flame retardancy at an excellent level, particularly being excellent in impact resistance, chemical resistance and fluidity, can be obtained by mixing a specific polyphenylene ether resin and a liquid-crystal polyester, optionally with further components, at a specific ratio, leading to the completion of the invention.

The present invention therefore provides:

1. A resin composition comprising:
   (A) 70 to 99 parts by weight of a polyphenylene ether resin, and
   (B) 1 to 30 parts by weight of a liquid-crystal polyester, wherein the polyphenylene ether resin in the composition contains 10 to 30 wt. % of polymer having a molecular weight of 20,000 or less and has a molecular weight distribution (Mw/Mn) of 1.8 to 3.5.
2. The resin composition according to the above item 1, wherein the polyphenylene ether resin contains 10 to 25 wt. % of polymer having a molecular weight of 20,000 or less, and has a molecular weight distribution (Mw/Mn) of 2.0 to 3.0.
3. The resin composition according to the above item 1, further comprising:
   (C) 0.1 to 10 parts by weight of a compound containing a monovalent, divalent, trivalent or tetravalent metal element based on 100 parts by weight, in total, of components (A) and (B).
4. The resin composition according to the above item 3, wherein the monovalent, divalent, trivalent or tetravalent metal element is at least one element selected from the group consisting of Zn, Mg, Ti, Sn, Sb, Al and Ge.
5. The resin composition according to the above item 3, wherein component (C) is at least one compound selected from the group consisting of ZnO, zinc acetate, zinc stearate, $Mg(OH)_2$, tetrabutoxide titanate and tetraisopropoxy titanate.
6. The resin composition according to any one of the above items 3 to 5, wherein the composition has a morphology comprising a continuous phase and a disperse phase, in which the abundance ratio (R) of Zn and/or Mg in the disperse phase obtained by TEM-EDX is 0.0005 or more and a requirement of Rd>Rm when Rm=0 or 150 Rm>Rd>Rm when Rm≠0 (wherein the abundance ratio (R) of Zn and/or Mg=(the number of L$\alpha$-rays of Zn and/or Mg)/(the number of K$\alpha$-rays of C), Rd represents R in the disperse phase, and Rm represents R in the continuous phase) is satisfied.
7. The resin composition according to any one of the above items 1 to 5, further comprising:
   (D) 0.05 to 30 parts by weight of a vinyl compound elastomer based on 100 parts by weight, in total, of components (A) and (B).
8. The resin composition according to the above item 7, wherein component (D) is functionalized with an acid anhydride group.
9. The resin composition according to any one of the above items 1 to 5, further comprising:
   (E) 0.1 to 10 parts by weight of a flame retardant based on 100 parts by weight, in total, of components (A) and (B).
10. The resin composition according to the above item 9, wherein component (E) is (F) a silicon compound.
11. The resin composition according to the above item 10, wherein component (F) is a silicone.
12. The resin composition according to the above item 10, wherein component (F) is a polyhedral oligomeric silsesquioxane or partially opened polyhedral oligomeric silsesquioxane.
13. The resin composition according to the above item 10, wherein component (F) is a silica.
14. The resin composition according to any one of the above items 10 to 13, further comprising:

(G) a cyclic nitrogen compound, wherein the weight ratio (f/g) of component (F) to component (G) is 0.1 to 10.
15. The resin composition according to the above item 14, wherein component (G) is a melamine, melem or mellon.
16. The resin composition according to the above item 9, wherein component (E) is a phosphorus flame retardant.
17. The resin composition according to the above item 16, wherein the phosphorus flame retardant has the following structure (1):

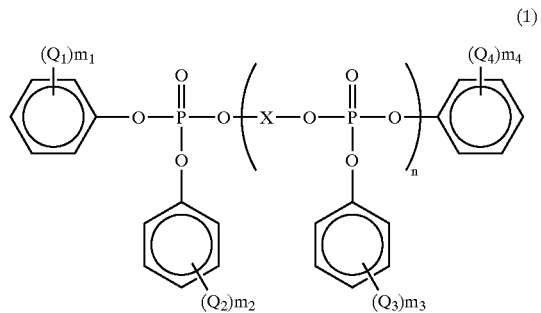

(1)

wherein $Q_1$, $Q_2$, $Q_3$ and $Q_4$ each independently represents an alkyl group having 1 to 6 carbon atoms or a hydrogen atom; n represents an integer of 1 or more; $m_1$, $m_2$, $m_3$ and $m_4$ each independently represents an integer of 0 to 3; and X is selected from formula (2):

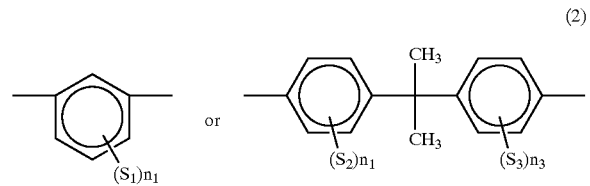

(2)

wherein $S_1$, $S_2$ and $S_3$ each independently represents a methyl group or a hydrogen atom; and $n_1$, $n_2$ and $n_3$ each independently represents an integer of 0 to 2.
18. A molded article obtained by molding the resin composition according to any one of the above items 1 to 5, 8 and 10 to 17.
19. The molded article according to the above item 18, wherein the molded article is a heat resistant part for automobiles or office machines.
20. The molded article according to the above item 18, wherein the molded article is a sheet.
21. A method for producing the composition according to the above item 1 or 2 comprising:
  providing a twin-screw extruder, and
  melt-kneading a resin with the twin-screw extruder set at a screw rotation speed (N) of 200 to 600 rpm, heat exposure ($\alpha$) of 50 or less and a temperature of the resin extruded from a die of 310 to 380° C. (wherein heat exposure ($\alpha$)=$D^3 \times N/Q \times 10^{-4}$; D (mm)=diameter of the screw of the twin-screw extruder; N (rpm)=screw rotation speed; and Q (kg/hr)=extrusion rate of the resin from the extruder).
22. A resin composition comprising:
  (A) 70 to 99 parts by weight of a polyphenylene ether resin,
  (B) 1 to 30 parts by weight of a liquid-crystal polyester, and 0.1 to 10 parts by weight of Zn and/or Mg based on 100 parts by weight, in total, of components (A) and (B);

wherein the abundance ratio (R) of Zn and/or Mg in the disperse phase obtained by TEM-EDX is 0.0005 or more, and a requirement of Rd>Rm when Rm=0 or 150 Rm>Rd>Rm when Rm≠0 (wherein the abundance ratio (R) of Zn and/or Mg=(the number of L$\alpha$-rays of Zn and/or Mg)/(the number of K$\alpha$-rays of C), Rd represents R in the disperse phase, and Rm represents R in the continuous phase) is satisfied.

DETAILED DESCRIPTION OF THE INVENTION

The present invention is described more specifically below.

The polyphenylene ether (A) is a homopolymer and/or copolymer comprising a recurring unit represented by the following formula (3):

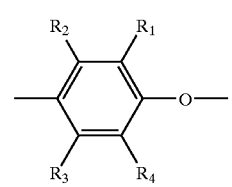

(3)

(wherein $R_1$ and $R_4$ each independently represents a hydrogen atom, a primary or secondary lower alkyl group, a phenyl group, an aminoalkyl group or a hydrocarbon oxy group; and $R_2$ and $R_3$ each independently represents a hydrogen atom, a primary or secondary lower alkyl group or a phenyl group), and having a reduced viscosity (as measured under the condition: 0.5 g/dl, chloroform solution, and 30° C.) of 0.15 to 1.0 dl/g. The reduced viscosity is preferably within a range of 0.20 to 0.70 dl/g, more preferably within a range of 0.40 to 0.60 dl/g.

Specific examples of the polyphenylene ether include poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether). The polyphenylene ether copolymers such as copolymers of 2,6-dimethylphenol and another phenol (such as 2,3,6-trimethylphenol or 2-methyl-6-butylphenol) are also usable. Among them, poly(2,6-dimethyl-1,4-phenylene ether) and a copolymer of 2,6-dimethylphenol and 2,3,6-trimethylphenol are preferred, of which the poly(2,6-dimethyl-1,4-phenylene ether) is more preferred.

Examples of a manufacturing process of the polyphenylene ether (A) to be used in the invention include the process described in U.S. Pat. No. 3,306,874 wherein 2,6-xylenol is subjected to oxidation polymerization in the presence of a complex comprising a cuprous salt and an amine as a catalyst. The process described in U.S. Pat. Nos. 3,306,875, 3,257,357 and 3,257,358, JP-B-52-17,880, JP-A-50-51,197 and JP-A-63-152,628 are also preferred as a manufacturing process of the polyphenylene ether (A).

The polyphenylene ether (A) of the present invention may be used in the form of a powder produced after polymerization or in the form of pellets produced by melt kneading the powder of polyphenylene ether (A) with an extruder in the atmosphere of a nitrogen gas or non-nitrogen gas with or without deaeration.

Specific examples of the polyphenylene ether also include functionalized polyphenylene ethers which are reacted with dienophile compounds. Specific examples of dienophile compounds include maleic anhydride, maleic acid, fumaric acid, phenyl maleimide, itaconic acid, acrylic acid, methacrylic acid, methyl acrylate, methyl methacrylate, glycidyl acrylate, glycidyl methacrylate, stearyl acrylate and styrene. As the method for functionalizing the polyphenylene ether with dienophile compounds, functionalizing the polyphenylene by melting the resins in the presence or absence of a radical generator by using an extruder, with or without deaeration, can be exemplified.

The polyphenylene ether resin (A) in the present invention may contain an aromatic vinyl polymer and/or another resin within an extent which does not damage the characteristics of the invention. Examples of the aromatic vinyl polymer include atactic polystyrene, syndiotactic polystyrene, high impact polystyrene, acrylonitrile-styrene copolymer, and acrylonitrile-styrene-butadiene copolymer. When a mixture of a polyphenylene ether resin and an aromatic vinyl polymer is used, the amount of the polyphenylene ether resin is preferably at least 70 wt. %, more preferably at least 80 wt %, most preferably at least 90 wt. % based on the total amount of the polyphenylene ether resin and aromatic vinyl polymer.

It is preferable that the polyphenylene ether resin in the composition of the present invention contains 10 to 30 wt. % of a polymer having a molecular weight of 20,000 or less, and has a molecular weight distribution (Mw/Mn) of 1.8 to 3.5. When the molecular weight and molecular weight distribution are in the above-described range, the composition of the present invention can exhibit excellent impact resistance and chemical resistance, which are usually difficult to attain simultaneously, at a high level. A minimum content of the polymer having a molecular weight of 20,000 or less in the polyphenylene ether is preferably 12 wt. %, more preferably 15 wt. %, from the viewpoint of fluidity of the composition. A maximum content of the polymer having a molecular weight of 20,000 or less in the polyphenylene ether is preferably 28 wt. %, more preferably 25 wt. %, from the viewpoint of the impact resistance and chemical resistance. The molecular weight distribution (Mw/Mn) of the polyphenylene ether resin is preferably 1.8 to 3.5, more preferably 2.0 to 3.0, most preferably 2.2 to 3.0 from the viewpoint of balance in fluidity, impact resistance and chemical resistance. When the molecular weight distribution (Mw/Mn) is less than 1.8, the fluidity tends to be decreased. When the molecular weight distribution (Mw/Mn) is more than 3.5, the impact resistance and chemical resistance tend to be decreased.

The molecular weight of polyphenylene ether as a raw material and that as one of the components of the present composition can be obtained in the following manner. That is, the molecular weight of polyphenylene ether is determined by using a gel permeation chromatography (GPC) apparatus ("HL-802 RTS", manufactured by Toyo Soda Co., Ltd.) and a working curve obtained from standard polystyrene samples. For the measurement, there are used standard polystyrene samples having a molecular weight of 264, 364, 466, 568, 2,800, 16,700, 186,000 or 1,260,000, chromatographic columns ("TSK gel G2500H XL", "TSK gel G3000H XL", "TSK gel G4000H XL" and "TSK gel G5000H XL", manufactured by Toyo Soda Co., Ltd.) connected in series and chloroform as a solvent. The measurement is conducted at a solvent flow rate of 0.9 ml/min, and at a temperature of the columns of 40° C. The molecular weights of standard polystyrene and polyphenylene ether are measured using wavelengths of ultraviolet rays of 254 nm and 283 nm, respectively.

In the case of polyphenylene ether contained in the composition, a sample is obtained by the following method. First, a strand or pellet obtained after extrusion or a molded article is dissolved in the chloroform at a temperature of 30° C., and insoluble material is removed therefrom. The resultant solution is charged in a sufficient amount of methanol to obtain precipitates, and powder is prepared by drying the precipitates. Then, the thus-obtained powder is dissolved at a temperature of 40 to 50° C. by adding methylene chloride thereto and left in a freezer (−5° C.) overnight to obtain precipitates. After filtering the solution, the resultant precipitates are washed with methyl chloride that is cooler than room temperature and then with methanol. The polyphenylene ether is obtained by vacuum drying at a temperature of 140° C. for 1 hour. The thus-obtained polyphenylene ether is used as a sample for the GPC measurement. In the case of polyphenylene ether itself, i.e., polyphenylene ether as a raw material, a sample such as a powder or pellet of the polyphenylene ether is dissolved in the chloroform at a temperature of 30° C. to conduct the measurement with GPC.

As the liquid-crystal polyester (B) of the invention, known polyesters called "thermotropic liquid-crystal polymers" can be used. Examples thereof include thermotropic liquid-crystal polymers having, as a main constitutional unit, p-hydroxybenzoic acid and polyethylene terephthalate, thermotropic liquid-crystal polyesters having as a main constitutional unit, p-hydroxybenzoic acid and 2-hydroxy-6-naphthoic acid and thermotropic liquid-crystal polyesters having, as a main constitutional unit, p-hydroxybenzoic acid, 4,4'-dihydroxybiphenyl and terephthalic acid. As the liquid-crystal polymer polyester (B) to be used in the invention, although no particular limitation is imposed on them, those having the following structural units (i) and (ii), and optionally (iii) and/or (iv) are preferred.

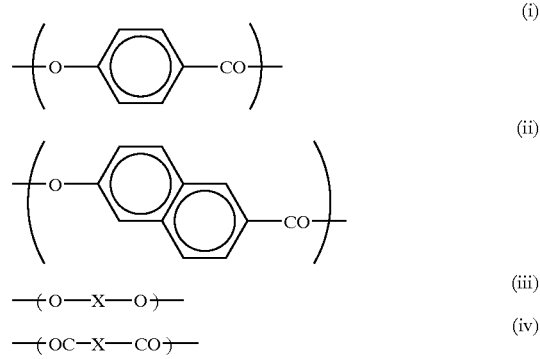

$$-\!\!\left(\text{O}\!-\!\text{X}\!-\!\text{O}\right)\!\!- \quad (iii)$$

$$-\!\!\left(\text{OC}\!-\!\text{X}\!-\!\text{CO}\right)\!\!- \quad (iv)$$

In the above-mentioned formulas, structural units (i) and (ii) are structural units of polyester prepared from p-hydroxybenzoic acid and structural units prepared from 2-hydroxy-6-naphthoic acid. Use of these structural units (i) and (ii) makes it possible to obtain a thermoplastic resin composition of the invention having excellent heat resistance and fluidity and being well balanced in mechanical properties such as rigidity. As X in the above-described structural units (iii) and (iv), one or more than one can be selected freely from the following formula (4):

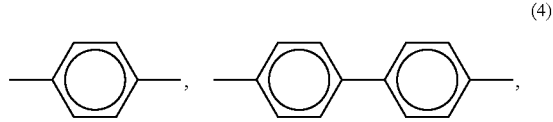

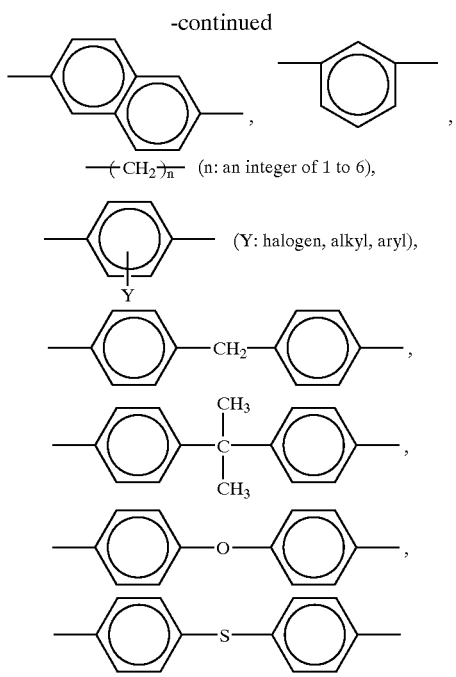

—(CH₂)ₙ— (n: an integer of 1 to 6), (Y: halogen, alkyl, aryl),

The preferred structural formula (iii) is a structural unit prepared from ethylene glycol, hydroquinone, 4,4'-dihydroxybiphenyl, 2,6-dihydroxynaphthalene or bisphenol A, of which that from ethylene glycol, 4,4'-dihydroxybiphenyl or hydroquinone is more preferred, with that from ethylene glycol or 4,4'-hydroxybiphenyl being particularly preferred. The preferred structural formula (iv) is a structural unit prepared from terephthalic acid, isophthalic acid or 2,6-dicarboxynaphthalene, of which that from terephthalic acid or isophthalic acid is more preferred.

As the structural formula (iii) or (iv), one or more than one structural unit exemplified above may be used in combination. More specifically, when at least two structural units are used in combination, examples of the combination for the structural formula (iii) include 1) a structural unit prepared from ethylene glycol/a structural unit prepared from hydroquinone, 2) a structural unit prepared from ethylene glycol/a structural unit prepared from 4,4'-dihydroxybiphenyl, and 3) a structural unit prepared from hydroquinone/a structural unit prepared from 4,4'-dihydroxybiphenyl.

Examples of the combination for the structural formula (iv) include 1) a structural unit prepared from terephthalic acid/a structural unit prepared from isophthalic acid and 2) a structural unit prepared from terephthalic acid/a structural unit prepared from 2,6-dicarboxynaphthalene. In these two components, the amount of terephthalic acid is preferably 40 wt. % or greater, more preferably 60 wt. % or greater, most preferably 80 wt. % or greater. By setting the amount of terephthalic acid at 40 wt. % or greater in the components, the resulting resin composition has relatively good fluidity and heat resistance. Although there is no particular limitation imposed on the ratio of the structural units (i), (ii), (iii) and (iv) in the liquid-crystal polyester component (B), the structural units (iii) and (iv) are used essentially in an equimolar amount.

A structural unit (V) comprising structural units (iii) and (iv) can be used as the structural units in the component (B). Specific examples include 1) a structural unit prepared from ethylene glycol and terephthalic acid, 2) a structural unit prepared from hydroquinone and terephthalic acid, 3) a structural unit prepared from 4,4'-dihydroxybiphenyl and terephthalic acid, 4) a structural unit prepared from 4,4'-dihydroxybiphenyl and isophthalic acid, and 5) a structural unit prepared from bisphenol A and terephthalic acid.

(V)

Into the liquid-crystal polyester component (B) of the invention, another structural unit prepared from an aromatic dicarboxylic acid, aromatic diol or aromatic hydrocarboxylic acid can be introduced as needed within a range of a small amount that does not adversely affect the object of the invention. A temperature at which the component (B) starts indicating a liquid crystal condition in a molten state (which will hereinafter be called "liquid-crystal starting temperature") is preferably 150 to 350° C., more preferably 180 to 320° C. By adjusting the liquid-crystal starting temperature to this range, the resin composition thus obtained has a favorable color tone and is well balanced in heat resistance and moldability.

The dielectric dissipation factor (tan δ) at 25° C. and 1 MHz of the liquid-crystal polyester component (B) of the invention is preferably 0.03 or less, more preferably 0.025 or less. The smaller this dielectric dissipation factor, the smaller the dielectric loss, which makes it possible to suppress generation of electronic noise when the resin composition is used as a raw material for electric and electronic parts. Particularly at 25° C. in a high-frequency region, that is, in a region of 1 to 10 GHz, the dielectric dissipation factor (tan δ) is preferably 0.03 or less, more preferably 0.025 or less.

The apparent melt viscosity (shear rate: 100/sec at a liquid-crystal starting temperature +30° C.) of the liquid-crystal polyester component (B) of the invention is preferably 10 to 3,000 Pa·s, more preferably 10 to 2,000 Pa·s, particularly preferably 10 to 1,000 Pa·s. By adjusting the apparent melt viscosity within this range, the resulting resin composition has preferable fluidity.

In the composition of the invention, the polyphenylene ether resin (A) is added in an amount of 70 to 99 parts by weight, preferably 80 to 98 parts by weight, more preferably 85 to 95 parts by weight. At an amount exceeding 99 parts by weight, the moldability is lowered, while amounts less than 70 parts by weight can impair the heat resistance and increase the specific gravity of the composition.

The liquid-crystal polyester as the component (B) of the invention is added in an amount of 30 to 1 parts by weight, preferably 20 to 2 parts by weight, more preferably 15 to 5 parts by weight. Amounts exceeding 30 parts by weight increase the specific gravity of the composition and the cost. On the other hand, at amounts less than 1 part by weight, a sufficient fluidity, impact strength and chemical resistance cannot be obtained.

The compound (C) containing a monovalent, divalent, trivalent or tetravalent metal element in the invention (hereinafter sometimes referred as to "component (C)") is a metal-containing inorganic or organic compound. The component (C) is essentially a compound having a metal element as a main component.

Specific examples of the metal element which may be monovalent, divalent, trivalent or tetravalent include Li, Na, K, Zn, Cd, Sn, Cu, Ni, Pd, Co, Fe, Ru, Mn, Pb, Mg, Ca, Sr, Ba, Al, Ti, Ge and Sb. Among them, Zn, Mg, Ti, Pd, Cd, Sn, Sb, Ni, Al and Ge are preferred, and Zn, Mg and Ti are more preferred. From the viewpoint of dramatically improving the dart impact resistance, Zn and/or Mg is especially preferred as a metal element which may be monovalent, divalent, trivalent or tetravalent.

Specific examples of the component (C) containing a monovalent, divalent, trivalent or tetravalent metal element include an oxide, hydroxide, alkoxide salt, aliphatic carboxylate and acetate of the above-exemplified metal element. Specific examples of oxides, which are preferred in the invention, include ZnO, MgO, TiO, TiO$_2$, PbO, CdO, SnO, SbO, Sb$_2$O$_3$, NiO, Al$_2$O$_3$, and GeO. Specific examples of hydroxides, which are preferred in the invention, include Zn(OH)$_2$, Mg(OH)$_2$, Ti(OH)$_4$, Ti(OH)$_2$, Pb(OH)$_2$, Cd(OH)$_2$, Sn(OH)$_2$, Sb(OH)$_2$, Sb(OH)$_3$, Ni(OH)$_2$, Al(OH)$_3$ and Ge(OH)$_2$. Specific examples of alkoxide salts, which are preferred in the invention, include Ti(O$^i$Pr)$_4$ and Ti(O$^n$Bu)$_4$. Specific examples of aliphatic carboxylates, which are preferred in the invention, include zinc stearate, magnesium stearate, titanium stearate, lead stearate, cadmium stearate, tin stearate, antimony stearate, nickel stearate, aluminum stearate and germanium stearate. Among them, especially preferred examples are ZnO, Mg(OH)$_2$, Ti(O$^i$Pr)$_4$, Ti(O$^n$Bu)$_4$, zinc acetate, zinc stearate and aluminum stearate.

In the invention, the amount of the component (C) is preferably 0.1 to 10 parts by weight, more preferably 0.2 to 5 parts by weight, still more preferably 0.4 to 3 parts by weight based on 100 parts by weight, in total, of the components (A) and (B). When the amount of the component (C) is less than 0.1 part by weight, sufficient effects for improving the dart impact resistance are not obtained. Amounts exceeding 10 parts by weight, on the other hand, cause only an increase in the specific gravity of the composition.

One of the characteristics of the invention is the morphology of the composition. The metallic elements added to the composition exist unevenly in the composition. That is, most of the metallic elements exist in the disperse phase. The continuous phase contains essentially none of the metallic elements or just a few. Even if the metallic elements are contained in the continuous phase, the amount of the metallic elements in the continuous phase is much less than in the disperse phase. The continuous phase comprises (A) polyphenylene ether resin. The disperse phase usually comprises (B) liquid-crystal polyester, optionally, and (D) elastomer. The metallic elements are derived from component (C). As the metallic elements, Zn and/or Mg is preferred.

Morphology of the composition is described below.

The morphology is observed with a transmission electron microscope (which may hereinafter be called "TEM"). The abundance ratio of the metallic elements such as Zn and Mg in the disperse phase is obtained by using TEM-EDX (which is usually called a "transmission electron microscope-energy dispersive X-ray spectrometer", and which makes it possible to determine the quantity and to identify the element in each phase upon the TEM observation). It is preferred that the abundance ratio (R) of the metallic elements in the disperse phase is 0.0005 or more and that the morphology meets the requirement of Rd>Rm when Rm=0 or 150 Rm>Rd>Rm when Rm≠0. The abundance ratio (R) of Zn and/or Mg=(the number of Lα-rays of Zn and/or Mg)/(the number of Kα-rays of C), wherein Rd represents R in the disperse phase, and Rm represents R in the continuous phase.

The abundance ratio (R) of Zn and/or Mg is determined in the following manner. Specimens approximately 100 nm thick are prepared by cutting them out from the center of strips that are 3.2 mm thick×216 mm length according to the ASTM standard which are obtained by injection molding. They are subjected to TEM observation without staining to count the number of Lα-rays of Zn and/or Mg and Kα-rays of element C in the disperse phase and the continuous phase, respectively, with TEM-EDX. In each phase, the numbers of Kα-rays and Lα-rays counted at 10 different spots are analyzed to obtain an average. In the case of analysis of spots in the disperse phase, the size of the spots is adjusted so as to be smaller than the diameter of the disperse phase. Each average of the numbers is assumed as the number of Lα-rays of Zn and/or Mg and Kα-rays of element C. The abundance ratio (R) of Zn and/or Mg is determined by the following formula:

Abundance ratio (R) of Zn and/or Mg=(the number of Lα-rays of Zn and/or Mg)/(the number of Kα-rays of C)

The fact that the requirement of Rd>Rm when Rm=0 or 150 Rm>Rd>Rm when Rm≠0 is satisfied means the disperse phase contains a higher amount of the metallic elements, which are derived from component (C) to be added in the composition, than the continuous phase does. It is important that the abundance ratio of the metallic elements, i.e., Zn and/or Mg, existing in the disperse phase is in a specific range. Such an abundance ratio in a specific range is especially effective to improve the dart impact resistance. From the viewpoint of dart impact resistance, the abundance ratio of Zn and/or Mg in the disperse phase is preferably 0.0005 or more, more preferably 0.001 or more. When Rm=0, "Rd>Rm" is preferred. When Rm≠0, "150 Rm>Rd>Rm" is preferred, "100 Rm>Rd>2 Rm" is more preferred, and "50 Rm>Rd>4 Rm" is most preferred.

The vinyl compound elastomer (D) (hereinafter sometimes referred to as "component (D)") in the invention is a polymerized vinyl compound, which exhibits elastic properties and has at least one glass transition temperature lower than room temperature. Although either homopolymer or copolymer is usable, usually a copolymer is used in the invention. Examples of vinyl compounds include aromatic vinyl compounds typified by styrene, conjugated diene compounds typified by butadiene and isoprene, and olefin compounds typified by ethylene, propylene and 1-octene. Specific examples of the vinyl compound elastomer include the following elastomers.

First examples of the vinyl compound elastomer are block copolymers comprising an aromatic vinyl compound and a conjugated diene compound, and partially hydrogenated block copolymers comprising an aromatic vinyl compound and a conjugated diene compound. The block copolymers of aromatic vinyl compounds and conjugated diene compounds are block copolymers comprising a block polymer segment having aromatic vinyl compounds as a main component and a block polymer segment having conjugated diene compounds as a main component. Specific examples of the aromatic vinyl compound include styrene, α-methyl styrene, vinyl toluene, p-tert-butyl styrene, divinyl benzene, p-methyl styrene, and 1,1-diphenyl styrene, from which at least one can be selected. Among them, styrene is preferred. Specific examples of the conjugated diene compound include butadiene, isoprene, 1,3-pentadiene, 2,3-dimethyl-1,3-butadiene, piperylene, 3-butyl-1,3-octadiene, and phenyl-1,3-butadiene, from which at least one can be selected. Among them, butadiene and isoprene or a combination thereof are preferred. A partially hydrogenated block copolymer of aromatic vinyl compounds and conjugated diene compounds is preferred for heat resistance and heat deterioration resistance. A hydrogenation rate of 5% to 100% is more preferred. A hydrogenation rate of 50% or more is more preferred for heat stability. Partially hydrogenated block copolymers having structural characteristics as described in JP-A-61-34,049 can be used individually or in combination. Specific examples of the partially hydrogenated block copolymers include "Taftec™" (manufactured by Asahi Kasei Corp.) and "KRATON™" (manufactured by Shell Oil Company).

Second examples of the vinyl compound elastomer include copolymers obtained by mainly copolymerizing ethylene and propylene, such as "Tafmer™" (manufactured by Mitsui Chemicals, Inc.).

Third examples of the vinyl compound elastomer include copolymers obtained by polymerizing ethylene with 1-octene in the presence of a metallocene catalyst, such as "Engage™" (manufactured by The Dow Chemical Company).

In the invention, the amount of component (D) is preferably 0.05 to 30 parts by weight, more preferably 0.1 to 15 parts by weight, most preferably 0.5 to 10 parts by weight based on 100 parts by weight, in total, of components (A) and (B). When the amount of compound (D) is less than 0.05 parts by weight, sufficient effects for improving the dart impact resistance may not be available. Amounts exceeding 30 parts by weight, on the other hand, may cause a decrease in the heat resistance of the composition.

The vinyl compound elastomer (D) functionalized with an acid anhydride group is preferred. As a compound containing an acid anhydride group, maleic anhydride is preferred. As a method for functionalizing an elastomer of component (D), melt-kneading in the presence or absence of a radical generator using an extruder can be used. Reacting them in solution also can be used.

Coexistence of the component (D) and the component (C) in the composition of the invention is very effective to achieve a sufficient dart impact resistance. A composition containing components (D) and (C) simultaneously improves the total energy absorption at dart impact dramatically and the aging resistance, compared with that containing only the component (C).

In the invention, examples of the (E) flame retardant include a silicon compound (F) and a phosphorus flame retardant. Examples of the silicon compound (F) include silicone, polyhedral oligomeric silsesquioxane or partially opened polyhedral oligomeric silsesquioxane, and silica.

The term silicone means an organosiloxane polymer. A silicone having a straight-chain structure, crosslinked structure or both a straight-chain structure and a crosslinked structure at a certain ratio can be used. The silicone can be used individually or in combination. A silicone having a straight-chain structure is preferred from the viewpoint of flame retardancy and fluidity. From the viewpoint of flame retardancy and impact resistance, a silicone having a functional group such as a terminal group or a side chain in the molecule is preferred. As the functional group, an epoxy group and an amino group are preferred. Examples of the silicone usable in the invention include silicone oil, modified silicone oil, silicone powder (manufactured by Dow Corning Toray Silicone Co., Ltd.), straight silicone oil, reactive silicone oil, unreactive silicone oil, and silicone powder KMP series (manufactured by Shin-Etsu chemical Co., Ltd.). The silicone, which is in the liquid state or solid state, can be used. With respect to the silicone in the liquid state, the viscosity of the silicone at 25° C. is preferably 10 to 10,000 (mm$^2$/s), more preferably 100 to 8,000 (mm$^2$/s), most preferably 500 to 3,000 (mm$^2$/s). With respect to the silicone in the solid state, an average diameter of silicone is preferably 0.1 to 100 $\mu$m, more preferably 0.5 to 30 $\mu$m, most preferably 0.5 to 5 $\mu$m. In the invention, the amount of the silicone is preferably 0.1 to 10 parts by weight, more preferably 0.3 to 5 parts by weight, most preferably 0.5 to 2 parts by weight based on 100 parts by weight, in total, of components (A) and (B). When the amount of the component (C) is less than 0.1 parts by weight, sufficient flame retardancy may not be available. Amounts exceeding 10 parts by weight, on the other hand, may cause a decrease in the stiffness of the composition.

The polyhedral oligomeric silsesquioxane and partially opened polyhedral oligomeric silsesquioxane are described below.

The polyhedral oligomeric silsesquioxane and partially opened polyhedral oligomeric silsesquioxane having a structure like a "closed cage" or "opened cage" can be used. That is, various types of the polyhedral oligomeric silsesquioxane and partially opened polyhedral oligomeric silsesquioxane can be used in this invention. Specific examples of the polyhedral oligomeric silsesquioxane and partially opened polyhedral oligomeric silsesquioxane include compounds represented by the following formulas (A) and (B):

$$(RSiO_{3/2})_n \hspace{4cm} (A)$$

$$(RSiO_{3/2})_l(RXSiO)_k \hspace{3cm} (B)$$

wherein, R each independently represents a hydrogen atom, a substituted or unsubstituted hydrocarbon group having 1 to 20 carbon atoms, or a group containing 1 to 10 of Si, and all of R may be the same or different from each other; and in the formula (B), X independently represents at least one functional group selected from OR$_1$ (R$_1$ is a hydrogen atom, alkyl group, aryl group or quaternary ammonium radical), a halogen element and the R defined above, all of X in (RXSiO)$_k$ may be the same or different from each other, and two of X in (RXSiO)$_k$ also can be combined to form a structure represented by the following formula (C):

wherein Y and Z are independently selected from the same group as X, and they may be the same or different from each other; n is an integer of 6 to 14; l is an integer of 2 to 12; and k is 2 or 3.

In the formula(s) (A) and/or (B), it is preferred that at least one of R, X, Y, Z is:

1) a group containing an unsaturated hydrocarbon bond (e.g., vinyl group and allyl group), or 2) a group containing polar groups containing nitrogen and/or oxygen (e.g., hydrocarbon radical substituted with an amino group such as —CH$_2$CH$_2$CH$_2$NH$_2$, a diamino group such as —CH$_2$CH$_2$CH$_2$—NH—CH$_2$CH$_2$NH$_2$, or a group containing an epoxy bond such as a glycidyl group).

Specific examples of the polyhedral oligomeric silsesquioxane represented by the formula (A) include a compound represented by (RSiO$_{1.5}$)$_6$ of formula (5), a compound represented by (RSiO$_{1.5}$)$_8$ of formula (6), a compound represented by (RSiO$_{1.5}$)$_{10}$ of formula (7), and a compound represented by (RSiO$_{1.5}$)$_{12}$ of formula (8)

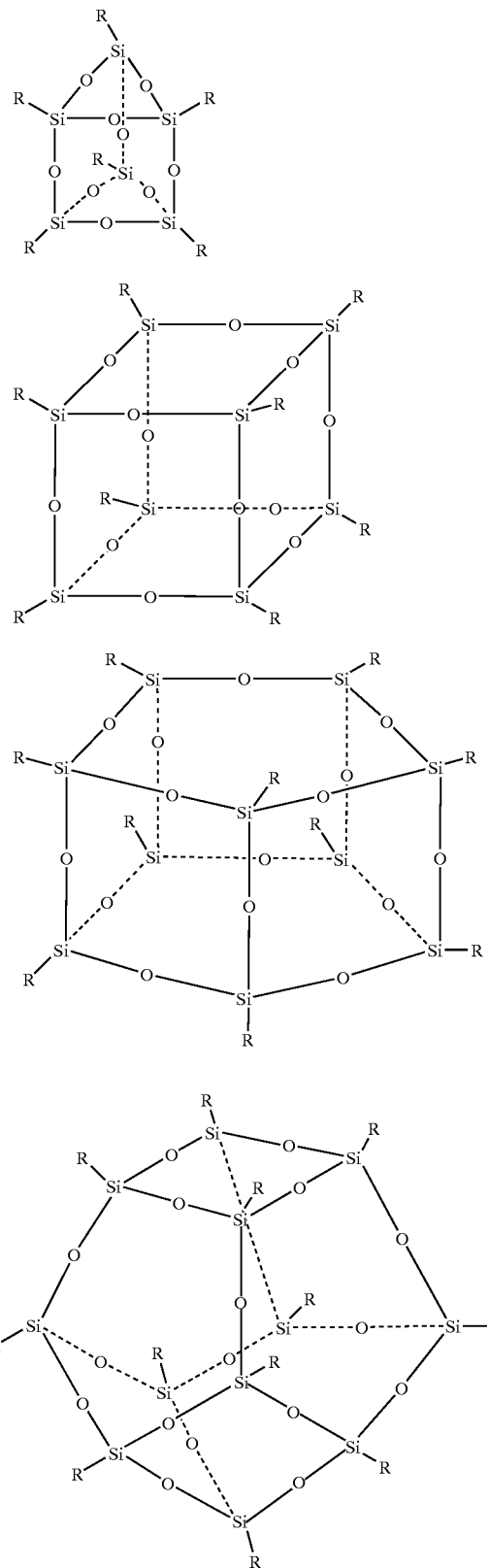

(5)
(6)
(7)
(8)

From the viewpoint of fluidity and flame retardancy, R is preferably an alkyl group such as an isobutyl group and isooctyl group, more preferably an isobutyl group.

In the polyhedral oligomeric silsesquioxane, it is preferred that at least 1 to 3 of R is (are) a group containing polar groups having at least one nitrogen or oxygen. Particularly preferred is a hydrocarbon radical substituted with an amino group, especially one containing a diamino group represented by the following structural formula (9) from the viewpoint of flame retardancy, fluidity, heat resistance and anti-sublimation.

$$—CH_2CH_2CH_2—NH—CH_2CH_2NH_2 \qquad (9)$$

Specific examples of the partially opened polyhedral oligomeric silsesquioxane include a compound containing a trisilanol unit or disilanol unit represented by the formula (10), (10-1), (11) or (12) (wherein when X is OH, the compound represented by the formula (10) is a compound containing the trisilanol unit, and the compound represented by the formula (11) is a compound containing the disilanol unit). In these formulas, R and X or Y and Z which respectively constitute a pair and are linked as a pair to Si are inter-exchangeable with each other in the pair. In other words, R and X are interchangeable with each other in a pair, and Y and Z are interchangeable with each other in a pair. The compounds exemplified above have partially opened structures of the formula (6), or structures derived from a compound represented by the formula (6). For example, the compound of the formula (10) is represented by the chemical formula $(RSiO_{3/2})_4(RXSiO)_3$. The compound of the formula (10-1) is represented by the chemical formula $(RSiO_{3/2})_4(RXSiO)_3$, and has a structure wherein 2 Xs out of 3 Xs are combined according to the structure represented by formula (C). The compounds of the formulas (11) and (12) are represented by the chemical formula $(RSiO_{3/2})_6(RXSiO)_2$.

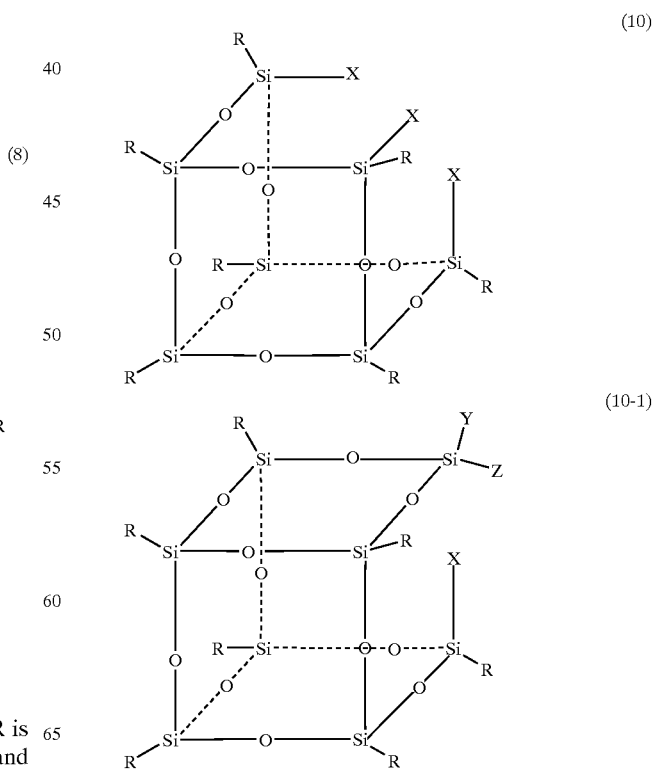

(10)

(10-1)

-continued

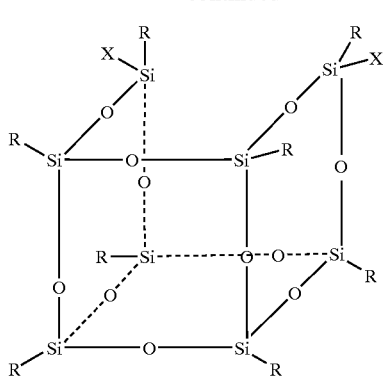

(11)

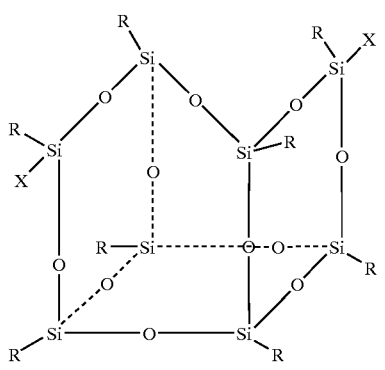

(12)

Methods for synthesizing the polyhedral oligomeric silsesquioxane are described, for instance, in "J. Am. Chem. Soc. 1965, 87, 4313" (Brown et al.), "J. Am. Chem. Soc. 1989, 111, 1741" (Feher et al.) and "Organometallics 1991, 10, 2526" (Feher et al.). According to one of these methods, the polyhedral oligomeric silsesquioxane is obtained in the form of crystals by reacting cyclohexyltriethoxysilane and tetraethylammonium hydroxide in the presence of a catalyst in a solution of water and methylisobutylketone. Further, "Chem. Commun., 1998, 1279 (Feher et al.)" describes that a trisilanol or ditrisilanol containing compounds represented by formulas (10) to (12) is simultaneously formed during the production of a completely condensed polyhedral oligomeric silsesquioxane, or is synthesized by partially cracking a completely condensed polyhedral oligomeric silsesquioxane using a fluoro acid or tetraethylammonium hydroxide. To analyze and identify the structure of a polyhedral oligomeric silsesquioxane, for example, an X-ray structure analysis was conducted according to the method described in "Alkiv Kemi, 16, 209 (1960)" (Larsson et al.). Further, as described for instance in "Innorag. Chem. 2, 189 (1963)" (Vogt et al.), a polyhedral oligomeric silsesquioxane can be simply identified using an infrared absorption spectrum or NMR.

In the invention, the amount of the polyhedral oligomeric silsesquioxane is preferably 0.1 to 10 parts by weight, more preferably 0.3 to 5 parts by weight, still more preferably 0.5 to 2 parts by weight based on 100 parts by weight, in total, of components (A) and (B). When the amount of the component (C) is less than 0.1 parts by weight, effects in the improvement of fluidity and flame retardancy are not sufficiently exhibited. Amounts exceeding 10 parts by weight, on the other hand, may cause a decrease in the impact resistance of the composition.

With respect to the silica, the fundamental structure is expressed by "$SiO_2$". From the viewpoint of flame retardancy, fumed silica is preferred. The fumed silica is also called a porous silica. The fumed silica is a fine particle having a diameter of 5 to 50 nm and large specific surface of approximately 50 to 500 $m^2/g$. Either a typical hydrophilic type or hydrophobic type, wherein the surface is chemically covered by a hydrophobic group such as a methyl group, can be used. Specifically, "AEROSIL™" (manufactured by Aerosil Nippon Co., Ltd.) is preferred. Further, as examples of Grades of the products, 200 and R972 are preferably used for improvement in the flame retardancy and impact resistance. In the invention, the amount of the fumed silica is preferably 0.1 to 10 parts by weight, more preferably 0.3 to 5 parts by weight, still more preferably 0.5 to 2 parts by weight based on 100 parts by weight, in total, of the components (A) and (B). When the amount of the component (C) is less than 0.1 part by weight, the flame retardancy is not sufficient. Amounts exceeding 10 parts by weight, on the other hand, may cause a decrease in the impact resistance of the composition.

The cyclic nitrogen compound (G) is a cyclic organic compound containing nitrogen. Specific examples of the cyclic nitrogen compounds include melamine derivatives, such as melamine, melem, and mellon. From the viewpoint of volatility, melem and mellon are preferred. It has been discovered that such compounds exhibit an excellent effect as a flame retardant auxiliary when used together with the silicon compound (F) in the composition of the invention. That is, the average combustion time in a burning test is shortened drastically.

The cyclic nitrogen compound (G) is preferably contained in the composition at a weight ratio (f/g) of the silicon compound (F) to the cyclic nitrogen compound (G) of 0.1 to 10, more preferably 0.5 to 5, most preferably 1 to 3. When the weight ratio (f/g) is less than 0.1, the appearance of the molded articles tends to be impaired. When the weight ratio (f/g) is more than 10, the flame retardancy tends not to be improved sufficiently.

In the invention, the amount of the silicon compound (F) is preferably 0.1 to 10 parts by weight, more preferably 0.3 to 5 parts by weight, still more preferably 0.5 to 2 parts by weight based on 100 parts by weight, in total, of the components (A) and (B). That is, a sufficient effect in the flame retardancy is attained by a very small amount of the compound. When the composition does not contain the silicon compound (F), it achieves V-1 in the UL standard in the burning test with a specimen having a thickness of 1.6 mm. On the other hand, when the composition contains a very small amount (e.g., about 1 part by weight) of the silicon compound (F), the flame retardancy of the composition is improved to be V-0 or 5V in the UL standard. Furthermore, the inclusion of silicon compound (F) improves the flame retardancy drastically without impairing heat resistance and fluidity.

As the flame retardant (E), specific examples of the phosphorus flame retardant include red phosphorus, phosphoric ester compounds, phosphite ester compounds and phosphazene compounds. Among them, red phosphorus and organic phosphoric compounds are preferred from the viewpoint of sufficiency in flame retardancy and environmental concerns. For reducing anisotropic physical properties in the flow direction of the melted resin at molding (MD) and the direction perpendicular to MD (TD), the organic phosphoric compound, particularly the phosphoric ester compound, is preferred. Specific examples of the phosphoric ester compound include mono-organic phosphoric compounds such as triphenyl phosphate and tricresyl phosphate, and organic phosphoric ester compound oligomers. The organic phosphoric ester compound oligomer is especially preferred.

Especially preferable examples of the organic phosphoric ester compound oligomer can be selected from the group consisting of compounds represented by the following formula (13):

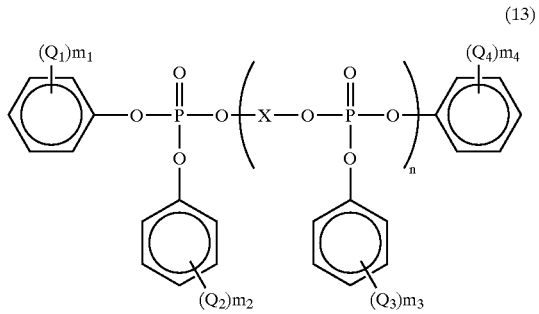

(13)

(wherein $Q_1$, $Q_2$, $Q_3$ and $Q_4$ each independently represents an alkyl group having 1 to 6 carbon atoms or a hydrogen atom; n represents an integer of 1 or more; $m_1$, $m_2$, $m_3$ and $m_4$ each independently represents an integer of 0 to 3; and X is selected from the compounds represented by the following formula (14):

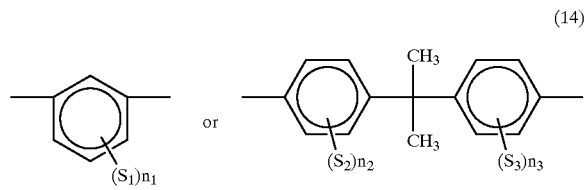

(14)

wherein $S_1$, $S_2$ and $S_3$ each independently represents a methyl group or a hydrogen atom; and $n_1$, $n_2$ and $n_3$ each independently represents an integer of 0 to 2.)

Specifically, "CR-741™", "CR-747™" or "CR-733S™" (manufactured by Daihachi Chemical Industry Co., Ltd.) is preferably usable.

In the invention, the amount of the phosphorus flame retardant is preferably 0.1 to 10 parts by weight, more preferably 1 to 8 parts by weight, still more preferably 3 to 5 parts by weight based on 100 parts by weight, in total, of the components (A) and (B). When the amount of the phosphorus flame retardant is less than 0.1 part by weight, the flame retardancy is not sufficient. Amounts exceeding 10 parts by weight, on the other hand, may cause a decrease in the heat resistance of the composition. Especially, as one of the characteristics of the above-mentioned flame retardant, use of the flame retardant reduces the anisotropy of the sheet obtained by molding the composition in the present invention and improves the property along the TD of the sheet, which tends to be lower in the conventional technique.

In the invention, another additional component can be added together with the above-described components as needed within an extent that does not impair the characteristics and advantages of the invention. Examples of the additional component include an inorganic filler (such as glass fibers, metallic fibers, potassium titanate, carbon fibers, silicon carbide, ceramics, silicon nitride, mica, nepheline syenite, talc, wollastonite, slag fibers and ferrite), antioxidants, plasticizers (such as mineral oil, low-molecular-weight polyethylene, epoxydized soybean oil, polyethylene glycol and fatty acid esters), weather(light)-resistance improvers, lubricants, various colorants and mold releasing agents. When the inorganic fillers are added as strength imparting agents, glass fibers and carbon fibers are preferred for a balance among fluidity, heat resistance and mechanical properties. Glass fibers are more preferred. No limitation is imposed on the shape of such inorganic fillers and free selection from fibrous, plate-type and spherical inorganic fillers is possible. Two or more of the inorganic fillers exemplified above can be used in combination. If necessary, the inorganic fillers may be provided for use after pretreatment with a coupling agent of the silane type or titanium type.

The resin composition of the invention can be prepared in various manners. For instance, it can be prepared by melt-kneading with heat using a single-screw extruder, twin-screw extruder, roll, kneader, Brabender Plastograph, or Banbury mixer. Among them, melt-kneading using a twin-screw extruder is most preferred.

In the present invention, the amount of the polyphenylene ether resin is relatively high. Therefore, when the polyphenylene ether powder is used, the torque required for melt-kneading tends to be higher. In the conventional molding manner, the polyphenylene ether resin is subjected to much heat history (an integration of heat and time to which a plastic composition is subjected during compounding) so that the molecular weight of the polyphenylene ether resin may be changed. It is preferred that the composition of the present invention is obtained by the following manner so as to maintain the molecular weight in a preferred range.

During melt-kneading, the cylinder temperature of an extruder can be selected freely from 250 to 350° C. in general. The temperature of the die head is set so that the temperature of resin extruded from the die is in the range from 310 to 380° C.

In the melt-kneading method with the twin-screw extruder, it is preferred to set the screw rotation speed (N) to be from 200 to 600 rpm and the amount of heat exposure ($\alpha$) to be 50 or less, wherein the amount of heat exposure $(\alpha) = D^3 \times N/Q \times 10^{-4}$;

D (mm)=diameter of the screw of the twin-screw extruder;

N (rpm)=screw rotation speed; and

Q (kg/hr)=extrusion rate of the resins from the extruder.

In the present invention, the amount of heat exposure ($\alpha$) is preferably 50 or less, more preferably 45 or less, especially preferably 36 or less. When the amount of heat exposure ($\alpha$) exceeds 50, damage of a polyphenylene ether by heat increases, and the balance of impact resistance, chemical resistance and fluidity is impaired. For example, from the viewpoint of reducing the amount of heat exposure ($\alpha$) and improving productivity, it is preferable that the extrusion rate (Q) of the extruder equipped with a screw having a specific diameter (D) is higher. However, the screw rotation speed (N) is preferably 200 to 600 rpm, more preferably 250 to 600 rpm, most preferably 280 to 600 rpm. Although the amount of heat exposure ($\alpha$) becomes smaller as the screw rotation speed (N) is slower, a screw rotation speed (N) that is too slow tends to cause insufficient mixing and insufficient impact strength of the composition. Although the screw diameter (D) of the twin-screw extruder depends on the scale of the extruder to be used, a screw having a diameter of 10 to 200 is usually used.

The temperature of the resin extruded from the die is measured by arranging a sensor of a thermocouple near the center of the opening of the die. The temperature is preferably 310 to 380° C., more preferably 320 to 360° C., most preferably 330 to 360° C., from the viewpoint of fluidity, impact resistance and chemical resistance. Especially, when the temperature exceeds 380° C., the fluidity of the composition tends to be decreased.

The resin composition thus obtained can be molded into various parts in the conventional manner such as injection molding, extrusion molding and blow molding.

Such molded products are particularly suitable for applications that require heat resistance and flame retardancy such as heat resistant parts for automobiles and office machines. Examples of the heat resistant parts for automobiles include alternator terminal, alternator connector, IC regulator, potentiometer bases for light dimmers, various valves such as exhaust gas valves, joints of engine coolant, carburetor main body, carburetor spacer, exhaust gas sensor, coolant sensor, oil temperature sensor, brake pad wear sensor, throttle position sensor, crank shaft position sensor, air flow meter, brake pad abrasion sensor, thermostat base for air conditioners, flow control valve of hot-air heaters, brush holder for radiator motor, water pump impeller, turbine vane, wiper motor part, distributor, starter switches, starter relay, wire harness for a transmission, window washer nozzle, air conditioner panel switch substrate, fuse connector, horn terminal, insulating plate for electrical components, step motor rotor, brake piston, solenoid bobbin, engine oil filter, and parts such as an ignition device case, wheel cap, lamp socket, lamp housing, lamp extension and lamp reflector Among them, the molded products can suitably be applied to lamp extensions and lamp reflectors for balance among lightweightness, heat resistance, flame retardancy and mechanical properties.

As the heat resistant parts for office electric machines, parts of household or office electronic appliances typified by parts for an air conditioner, parts of a typewriter and parts of a word processor; office-computer-related parts; telephone-related parts; facsimile-related parts and copying-machine-related parts are preferred.

Examples of the molded articles obtained by molding the composition include a sheet. The thickness of the sheet is preferably 0.010 to 1.0 mm, more preferably 0.050 to 0.50 mm. Such a thin sheet is sometimes called a film.

The sheet of the invention is obtained by sheet-extrusion molding the above-described composition. Specific examples of the sheet-extrusion molding include T-die extrusion molding and blow-film extrusion. The T-die extrusion molding is preferred from the viewpoint of heat shrinkage rate and unevenness of thickness. The sheet can be used without stretching or after axial-stretching or biaxial-stretching.

In the method for molding the sheets, it is preferred to adjust the temperature of a surface of a forming roll arranged just after the T-die in a range of preferably 120 to 200° C., more preferably 130 to 180° C., especially preferably 150 to 170° C. It is preferred to adjust the temperature so as to be stable. The deviation of the temperature is preferably within ±10° C., more preferably ±5° C., especially preferably ±2° C. From the viewpoint of unevenness of thickness and heat shrinkage rate, a smaller deviation is more preferred. It is one of the characteristics of the composition in the present invention that the amount of unsuitable mass accumulated at the T-die extrusion molding is very small. The term "unsuitable mass" indicates decomposed oligomer or a cross-linked polymer accumulating in the vicinity of the opening of the T-die where the melted resin is extruded, which sometimes adheres to or is contained in a molded sheet as a foreign substance (contaminant) and impairs the stability of the sheet production.

The sheet exhibits excellent balance among the flame retardancy, evenness of thickness, dielectric breakdown strength, heat shrinkage rate and tensile property, particularly at a high temperature. The sheet can be used for mechanical parts, for example, arranged in household or office electric appliances typified by personal computers, cellular phones, refrigerators, facsimile machines and copiers, insulating parts such as printed-wiring boards and insulating washers for lithium ion batteries.

BEST MODE FOR CARRYING OUT THE INVENTION

The present invention will hereinafter be described based on Examples. However, they should not be construed as limiting the scope of the present invention.

(Components to be Used in Examples and Comparative Examples)

1. Polyphenylene Ether

The following poly(2,6-dimethyl-1,4-phenylene), which was obtained by oxidation-polymerizing 2,6-dimethylphenol, was used.

PPE-1: reduced viscosity=0.42, Mw=34,600, Mw/Mn=1.90
PPE-2: reduced viscosity=0.46, Mw=40,700, Mw/Mn=2.42
PPE-3: reduced viscosity=0.52, Mw=51,900, Mw/Mn=1.95
PPE-4: reduced viscosity=0.51, Mw=48,000, Mw/Mn=2.79
PPE-5: reduced viscosity=0.55, Mw=58,200, Mw/Mn=3.31
PPE-6: reduced viscosity=0.57, Mw=57,900, Mw/Mn=1.88
PPE-7: reduced viscosity=0.39, Mw=43,000, Mw/Mn=2.87
PPE-8: reduced viscosity=0.37, Mw=41,600, Mw/Mn=3.41

(Condition for Measuring Molecular Weight)

The molecular weight of polyphenylene ether was determined by using gel permeation chromatography (GPC) ("HL-802 RTS", manufactured by Toyo Soda Co., Ltd.) and a working curve obtained from standard polystyrene samples. For the measurement, there are used standard polystyrene samples having a molecular weight of 264, 364, 466, 568, 2,800, 16,700, 186,000 or 1,260,000, chromatographic columns ("TSK gel G2500H XL", "TSK gel G3000H XL", "TSK gel G4000H XL" and "TSK gel G5000H XL", manufactured by Toyo Soda Co., Ltd.) connected in series and chloroform as a solvent. The measurement is conducted at a solvent flow rate of 0.9 ml/min, and at a temperature of the columns of 40° C. The molecular weights of standard polystyrene and polyphenylene ether are measured using the wavelength of ultraviolet rays of 254 nm and 283 nm, respectively. The above-described PPE-1 to 8 were dissolved directly in the chloroform and subjected to the GPC measurement. Liquid-crystal polyester:

LCP-1: Under a nitrogen atmosphere, p-hydroxybenzoic acid, 2-hydroxy-6-naphthoic acid and acetic anhydride were charged, followed by melting under heat and polycondensation, whereby the liquid-crystal polyester having the below-described theoretical structural formula was obtained. The component ratio of the composition is indicated by a molar ratio.

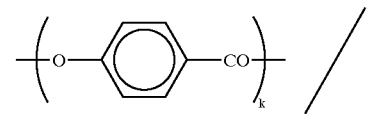

-continued

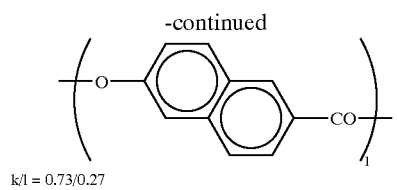

k/l = 0.73/0.27

LCP-2: Under a nitrogen atmosphere, p-hydroxybenzoic acid, polyethylene terephthalate and acetic anhydride were charged, followed by melting under heat and polycondensation, whereby the liquid-crystal polyester having the below-described theoretical structural formula was obtained. The component ratio of the composition is indicated by a molar ratio.

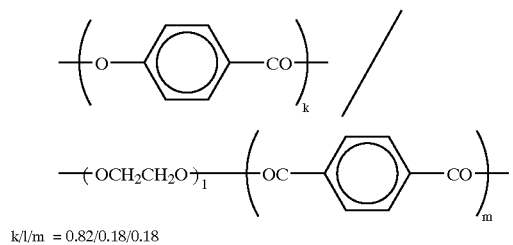

k/l/m = 0.82/0.18/0.18

LCP-3: Under a nitrogen atmosphere, p-hydroxybenzoic acid, 2-hydroxy-6-naphthoic acid, hydroquinone, isophthalic acid and acetic anhydride were charged, followed by melting under heat and polycondensation, whereby the liquid-crystal polyester having the below-described theoretical structural formula was obtained. The component ratio of the composition is indicated by a molar ratio.

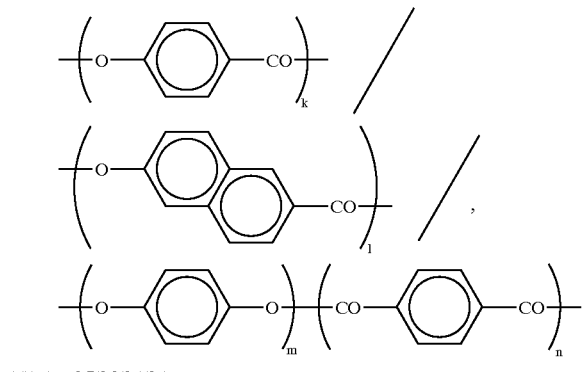

k/l/m/n = 0.7/0.2/0.1/0.1

Each of the resin compositions molded by the following methods was evaluated in the following manners.
(1) Molding
(1-1) Injection Molding The pellets obtained in the Examples or Comparative Examples were molded using an injection molding machine ("IS-80EPN", manufactured by Toshiba Machine Co., Ltd.) set at a cylinder temperature of 330/330/320/310° C., an injection rate of 85% and a mold temperature of 90° C. In Comparative Example 4 wherein a strip specimen of 1.6 mm thick was molded, however, the cavity of a metal mold could not be filled with a molten resin even at an injection pressure of 13 Mpa (gage pressure), which was the maximum injection pressure for the machine. Thus, the mold temperature was set at 140° C.

(1-2) T-Die Extrusion Molding (Sheet Molding)

The obtained pellets were extrusion-sheet molded using a single-screw extruder set at a cylinder temperature of 300° C., a T-die temperature of 300° C., an extrusion rate of 60 Kg/hr and a take-off speed of 4.2 to 4.8 m/min. Die clearance was set to 0.5 mm. Roller clearance was set to 0.25 to 0.30 mm. The diameter of the screw used was 65 mm.

(2) Measurement of Molecular Weight Ratio and Molecular Weight Distribution (Mw/Mn)

A small specimen with a few square mm was obtained by cutting an ASTM strip specimen 1.6 mm thick×127 mm long×12.7 mm wide, which was prepared by the above-described molding. The small specimen was dissolved in chloroform at a temperature of 30° C. Precipitates and contaminants were removed from the chloroform solution by using a membrane filter. Powder was obtained by drying precipitates obtained by adding the chloroform solution to a sufficient amount of methanol. The thus-obtained powder was dissolved at a temperature of 40 to 50° C. by adding methylene chloride thereto and left in a freezer (−5° C.) overnight thereafter to obtain precipitates. The precipitate was recovered by filtering and washed with methylene chloride being cooler than room temperature and then with methanol. Polyphenylene ether was obtained by vacuum drying at a temperature of 140° C. for 1 hour. The weight ratio of polymer having a molecular weight of 20,000 or less and molecular weight distribution (Mw/Mn) of the polyphenylene ether resin was measured according to the above-described GPC measurement.

(3) Impact Resistance 1 (Izod Impact Strength)

According to ASTM D256, specimens having a thickness of 3.2 mm were molded. The Izod impact strength of V-notched specimens was measured.

(4) Chemical Resistance

An ASTM dumbbell specimen 3.2 mm thick was kept in a solution comprising 60 wt. % of isopropanol and 40 wt. % of cyclohexane for 30 minutes under 0.5% strain at a temperature of 23° C. The solvent sufficiently evaporated after the specimen was pulled up from the solution, and the tensile strength ($TS_1$) of the specimen was evaluated at a chuck distance of 115 mm and a test speed of 20 mm/min by using an autograph ("AG-5000", manufactured by Shimadzu Corporation). The tensile strength ($TS_0$) of a specimen not dipped in the solution was evaluated in the same manner. Retention of tensile strength (%) was obtained according to the following equation.

$$\text{Retention of tensile strength } (\%) = TS_1/TS_0 \times 100$$

A larger retention of tensile strength means that the chemical resistance is better. A broken specimen when pulled out from the solution is shown as "X" in the Tables.

(5) Fluidity

At the time when the obtained pellets were injection molded into an ASTM specimen 1.6 mm thick under the condition as described in the above (1-1), the gauge pressure, at which the resultant specimen was obtained just after being injection molded, being shorter than the cavity by 1 mm in length, was measured. The gauge pressure was assumed as a short shot pressure ("SSP") (Mpa). The smaller the SSP, the better the fluidity.

(6) Heat Resistance (DTUL)

ASTM strip specimens 3.2 mm thick×127 mm long×12.7 mm wide were obtained by molding. According to ASTM D648, the heat distortion temperature of the resultant specimens was measured under a load of 1.82 Mpa.

(7) Flame Retardancy
(Average Combustion Time)

An ASTM strip specimen 1.6 mm thick×127 mm long× 12.7 mm wide was obtained by molding and a burning test was conducted based on UL-94 Vertical Burning Test of Underwriters Laboratories. This burning test was conducted on five specimens. Assuming that the time from the removal of a flame after ignition of each specimen therewith for 10 seconds until extinction of the flame is the combustion time $t_1$ (sec) and the time from the removal of a flame after ignition of the specimens therewith again for 10 seconds until extinction of the flame is the combustion time $t_2$ (sec), an average combustion time of $t_1$ and $t_2$ of each of five specimens was determined.

(Dropping of Flaming Article)

It was observed whether any flaming article dropped in the burning tests for $t_1$ and $t_2$ for each of five specimens (ten tests in total).

○: No dropping observed in all of the ten tests

X: Dropping observed in at least one of the ten tests (8) Impact Resistance 2
(Dart Impact and Ductile Fracture)

Specimens in the shape of a flat plate 2.5 mm thick×90 mm long×50 mm wide were prepared by molding. Measurement of the specimens was conducted under the conditions of a dropping load of 6.5 kg and drop height of 100 cm by using a dart impact tester (manufactured by Toyo Seiki Co., Ltd.), and the whole absorption energy, i.e., the sum of cracking energy and propagation energy upon fracture, was designated as a dart impact (J). The greater the dart impact, the better the impact resistance. When the plate specimen was observed from a thickness direction after the fracture test, a ductile fracture was defined as a state where deformation occurred as if the specimen had been hammered thin at the place where the dart was dropped. A brittle fracture was defined as a state where complete gouging occurred at the place where the dart was dropped but the test piece remained flat without deformation. Based on the above-described standards, the ductile fracture was judged. The test was conducted five times (test number (n)=5).

○: Ductile fracture occurred in all of the five tests.

Δ: Ductile fracture occurred 1 to 4 times out of the five tests, while brittle fracture occurred in the rest of the tests.

X: Brittle fracture occurred in all of the five tests.

(9) Abundance Ratio (R) of Zn and/or Mg

According to the molding manner described in the above (1-1), dumbbell bars 3.2 mm thick×216 mm length, based on the ASTM standard, were prepared by injection molding. Specimens having a thickness of 100 nm were obtained by cutting out from the center of the dumbbell bar with an ultramicrotome. The specimens without staining were analyzed at a TEM acceleration voltage of 100 kV with a transmission electron microscope ("JEM-2010", manufactured by JEOL Ltd.). As an EDX apparatus, "VANTAGE DS 400x" (manufactured by Noran Instruments Corp.) was used. The analysis was continued until the number of CKα-rays exceeded 430,000. In the disperse phase and the continuous phase, the number of the Lα-rays of Zn and/or Mg and the Kα-rays of element C was counted using TEM-EDX. An average number was obtained by analyzing 10 different spots in each phase. When the spots in the disperse phase were analyzed, the size of the spots was adjusted to be smaller than the diameter of the disperse phase. The average numbers are taken for the number of Lα-rays of Zn and/or Mg and Kα-rays of element C. The abundance ratio (R) of Zn and/or Mg was obtained according to the following equation:

Abundance ratio (R) of Zn and/or Mg=(the number of Lα-rays of Zn and/or Mg)/(the number of Kα-rays of C)

In the equation, Rd represents R in the disperse phase, and Rm represents R in the continuous phase. In the Tables, specimens satisfying the requirement of Rd>Rm when Rm=0 or 150 Rm>Rd>Rm when Rm≠0 is defined as "○", and specimens not satisfying the requirements of Rd>Rm when Rm=0 or 150 Rm>Rd>Rm when Rm≠0 is defined as "X".

(10) Tensile Properties

A tensile test of an ASTM dumbbell specimen 3.2 mm thick was conducted at a chuck distance of 115 mm and a test speed of 20 mm/min by using an autograph ("AG-5000", manufactured by Shimadzu Corporation), whereby the breaking extension (%) was measured.

(11) Sheet Moldability

When the sheet-extrusion molding was conducted in the manner described in the above (1-2), sheet moldability was evaluated and defined as follows:

○: A sheet with even thickness was steadily molded during continuous molding over 30 minutes without causing a torque problem in the extruder.

Δ: A sheet with even thickness was difficult to mold owing to occurrence of a resin mass at the roll though a torque problem was not caused in the extruder.

X: A sheet was not molded owing to a torque problem in the extruder.

(12) Amount of Unsuitable Mass

During the extrusion-sheet molding, an unsuitable mass was accumulated at a lip of a T-die and sometimes contained in a sheet as a (black umber) contaminant. The amount of the contaminant contained in the sheet was evaluated and defined as follows:

○: No contaminant was observed in the sheet during continuous molding for 30 minutes X: At least one contaminant was observed in the sheet during continuous molding for 30 minutes (Sheet Property)
(13) Flame Retardancy of Sheet
(13-1) Maximum Combustion Time A sheet obtained in the manner described in the above (1-2) was cut along MD (melt flow direction) and TD (direction perpendicular to MD) to prepare specimens 200 mm long×50 mm wide. Each of the MD and TD sides of the specimens was subjected to a burning test based on the UL-94 film standard of Underwriters Laboratories. Specifically, test pieces were prepared by rolling the specimens into a cylindrical shape having a diameter of 13 mm. The test pieces were fixed vertically, and the upper opening thereof was sealed. Then, the burning test was made on five test pieces on the MD and TD, respectively. Assuming that the time from removal of a flame after ignition of each specimen therewith for 3 seconds until extinction of the flame is the combustion time $t_1$ (second) and the time from removal of a flame after ignition of each specimen therewith again for 3 seconds until extinction of the flame is the combustion time $t_2$ (second), the maximum combustion time among $t_1$ and $t_2$ of each of the five test pieces (10 results in total) was determined.

(13-2) Total Combustion Time

The total combustion time was obtained by adding $t_1$ and $t_2$ of each of the five specimens, i.e., 10 numeric values, obtained in the above (13-1).

(13-3) UL Film Standard

The results of the burning test were evaluated based on the UL-94 film standard, and determined as follows:

VTM-0: No dropping of burning article, total combustion time of 50 minutes or less VTM-1: No dropping of burning article, total combustion time of 250 minutes or less

(14) Evenness of Sheet Thickness (Dt)

Specimens 150 mm long×150 mm wide were prepared by cutting the sheet obtained in the manner described in the above (1-2) along the MD (melt flow direction) and the TD (direction perpendicular to MD). Thickness of the specimens was measured at 9 points using a microgauge. The evenness of the thickness (Dt) was obtained according to the following equation:

$$Dt\ (\%)=(Tmax-Tav)/Tav\times 100$$

wherein Tmax represents a maximum thickness among those obtained at the 9 points; and Tav represents an average of thicknesses obtained at the 9 points.

(15) Dielectric Breakdown Strength

Specimens 100 mm long×100 mm wide were prepared by cutting the sheet obtained in the manner described in the above (1-2). Dielectric breakdown strength was measured based on JIS K6911 at a temperature of 23° C. by using dielectric strength tester SD-12 type (manufactured by Toshiba Corp.).

(16) Heat Shrinkage Rate

Specimens 150 mm long×150 mm wide were prepared by cutting the sheet obtained in the manner described in the above (1-2) along the MD (melt flow direction) and TD (direction perpendicular to MD). The specimens were heated in an oven at a temperature of 150° C. for 5 hours, followed by aging for 24 hours at a temperature of 23° C. in humidity of 50% after being cooled down. Each length along the MD and TD of the specimens before and after heating was measured. A heat shrinkage rate was obtained according to the following equation:

Heat shrinkage rate (%)=(Length of a side before heating−Length of a side after heating)/(Length of a side before heating)×100

(17) Tensile Properties (Rigidity at High Temperature)

A strip specimen 6 mm wide was obtained by cutting the sheet obtained in the manner as described in the above (1). Tensile strength (TS) of the strip specimen was measured at a chuck distance of 80 mm and a test speed of 50 mm/min by using an autograph ("AG-5000", manufactured by Shimadzu Corporation). The measurement was conducted in the MD and TD at a temperature of 23° C. and 150° C.

EXAMPLES 1 TO 11 AND COMPARATIVE EXAMPLES 1 TO 3

Pellets were obtained by melt-kneading the polyphenylene ether (PPE-1 to 8) and the liquid-crystal polyester (LCP-1 to 3) at a ratio (parts by weight) shown in Table 1 using a twin-screw extruder ("ZSK-25", manufactured by Werner & Pfleiderer Corp.; D=25 mm, L/D=42), which was set at 270° C. at ZONE 1 (on the feeding side), and 310° C. at ZONEs 2 to 7 and a die head, and which was equipped with a vent port, at a screw rotation speed (N) of 300 rpm and at a extrusion rate of 14.6 kg/hr. The obtained pellets were molded in the manner mentioned above and physical properties of the molded articles were evaluated. Further, as described above, using strip specimens having a thickness of 3.2 mm, the weight ratio of the polymer having a molecular weight of 20,000 or less contained in the polyphenylene ether resin and the molecular weight distribution (Mm/Mn) of the polyphenylene ether resin were measured. The molecular weight obtained and evaluation results of physical properties of the composition are shown together in Table 1. In the table, "HIPS" and "GF" indicates high impact polystyrene ("H9405", manufactured by A & M Styrene Co., Ltd.,) and glass fibers ("Microglass RES03-TP30", manufactured by NGF Company), respectively.

Table 1 shows that the composition exhibits excellent balance in impact resistance, chemical resistance and fluidity as well as heat resistance and flame retardancy when the polyphenylene ether resin in the composition contains 10 to 30 wt. % of polymer having a molecular weight of 20,000 or less and has a molecular weight distribution (Mw/Mn) of 1.8 to 3.5.

COMPARATIVE EXAMPLE 4

A specimen was prepared in substantially the same manner as in Example 1 except that liquid-crystal polyester (LCP-1) was not used, and the physical properties were evaluated.

EXAMPLE 12

A specimen was prepared in substantially the same manner as in Example 3 except that the components shown in Table 2 were used and a twin-screw extruder ("ZSK-40 Mega Compounder", manufactured by Werner & Pfleiderer Corp., D=40 mm, L/D=47) equipped with a vent port was operated at a screw rotation speed (N) of 300 rpm and at an extrusion rate (Q) of 60.0 kg/hr, and the physical properties were evaluated. When the temperature of the melted composition extruded from the extruder was measured by arranging a sensor of a thermocouple near the center of the opening of the die, the resin temperature was 350° C. The amount of heat exposure (α) was obtained according to the following equation:

$$\alpha=D^3\times N/Q\times 10^{-4}$$

The results are shown in Table 2.

COMPARATIVE EXAMPLE 5

A specimen was prepared in substantially the same manner as in Example 12 except that the extruder was set at an extrusion rate of 31.0 kg/hr, and the physical properties were evaluated. The temperature of the melted composition extruded from the extruder was 350° C. The results are shown in Table 2.

COMPARATIVE EXAMPLE 6

A specimen was prepared in substantially the same manner as in Example 12 except that the extruder was operated at a screw rotation speed (N) of 900 rpm and at an extrusion rate of 180.0 kg/hr, and the physical properties were evaluated. The temperature of the melted composition extruded from the extruder was 386° C., which was thought to be high. The results are shown in Table 2.

EXAMPLE 13

A specimen was prepared in substantially the same manner as in Example 12 except that the extruder was operated at a screw rotation speed (N) of 600 rpm and at an extrusion rate of 115.0 kg/hr, and the physical properties were evaluated. The temperature of the melted composition extruded from the extruder was 368° C. The results are shown in Table 2. This example shows that the composition exhibits an excellent balance in impact resistance, chemical resistance and fluidity as well as heat resistance and flame retardancy as long as α is within a suitable range even when the screw rotation speed is increased.

EXAMPLES 14 TO 39

Specimens were prepared in substantially the same manner as in Example 1 except that each component was used at a ratio as shown in Table 3, and the physical properties were evaluated. Components (C) and (D) used herein were as listed below.

Component (C)

ZnO: zinc oxide (JIS special grade, manufactured by Wako Pure Chemical Industries, Ltd.)
Mg(OH)$_2$: magnesium hydrate (JIS special grade, manufactured by Wako Pure Chemical Industries, Ltd.)
Ti(iOPr)$_4$: tetraisopropoxy titanate (JIS special grade, manufactured by Wako Pure Chemical Industries, Ltd.)
Zn(OAc)$_2$: zinc acetate (JIS special grade, manufactured by Wako Pure Chemical Industries, Ltd.)
ZnSt$_2$: zinc stearate (JIS special grade, manufactured by Wako Pure Chemical Industries, Ltd.)
ZnS: zinc sulfide (JIS special grade, manufactured by Wako Pure Chemical Industries, Ltd.)
Cu$_2$O: cupric I oxide (JIS special grade, manufactured by Wako Pure Chemical Industries, Ltd.)
Al$_2$O$_3$: aluminum oxide (JIS special grade, manufactured by Wako Pure Chemical Industries, Ltd.)

Component (D)

Elastomer-1: "Tuftec™ H1911" (manufactured by Asahi Kasei Corp.)
Elastomer-2: "Tuftec™ H1041" (manufactured by Asahi Kasei Corp.)
Elastomer-3: "Tuftec™ H1272" (manufactured by Asahi Kasei Corp.)
Elastomer-4: "Tafmer™ MA8510" (functionalized with maleic anhydride, manufactured by Mitsui Chemicals, Inc.)
Elastomer-5: "Engag™ MN493D" (functionalized with maleic anhydride, manufactured by The Dow Chemical Company)

In Examples 1, 15, 16, 18, 19 and 24, the abundance ratio (R) of Zn and/or Mg was measured with a transmission electron microscope in the above-described manner.

Table 3 shows that surprisingly, the addition of component (C) of the compound containing a monovalent, divalent, trivalent or tetravalent metal element drastically improves the dart impact resistance of the composition, and is especially very effective with ZnO, Mg(OH)$_2$, Ti(iOPr)$_4$, Zn(OAc)$_2$ and ZnSt$_2$, and that a preferable amount of the component (C) is 0.4 parts by weight or more.

The composition of the present invention has characteristic morphology. That is, most of the metallic elements exist in the disperse phase. The Examples show that the morphology is very important to the dart impact resistance.

Using component (D) of elastomer together with component (C) in the composition of the invention, a higher dart impact resistance was attained. Further, only a small amount of component (D) is sufficient to achieve such an excellent effect.

The specimens for the dart impact resistance test used in Examples 16 and 24 were aged at 120° C. for 50 hours and retention of the dart impact energy of the respective specimens was evaluated. The retention obtained in Example 16 was 45%, while that in Example 24 was 85%. These results show that addition of the elastomer is effective on the aging-resistance property also.

The results obtained above show that addition of component (C) of the compound containing a monovalent, divalent, trivalent or tetravalent metal element gives the composition excellent dart impact resistance as well as impact resistance, chemical resistance, fluidity, heat resistance and flame retardancy.

EXAMPLES 40 TO 56

Specimens were prepared in substantially the same manner as in Example 1 except that each component was used at the ratio shown in Table 4, and the physical properties were evaluated. Components (E) and (G) used herein were as listed below.

Si-1: silicone containing an amino group, "SF8417" (manufactured by Dow Corning Toray Silicone Co., Ltd.)
Si-2: silicone containing an amino group, "X-22-1660B-3" (manufactured by Shin-Etsu Chemical Co., Ltd.)
Si-3: silicone containing an epoxy group, "SF8411" (manufactured by Dow Corning Toray Silicone Co., Ltd.)
Si-4: silicone powder, "R-900" (manufactured by Dow Corning Toray Silicone Co., Ltd.)
Si-5: straight silicone oil, "SH200 Oil" (manufactured by Dow Corning Toray Silicone Co., Ltd.)
Si-6: polyhedral oligomeric silsesquioxane, octaisobutyl-octasilsesquioxane (in the formula (6), R=isobutyl; white solid)
Si-7: polyhedral oligomeric silsesquioxane containing a group having a diamino structure, N(2-aminoethyl)propylamino(heptaisobutyl)-octasilsesquioxane (in the formula (6), R=isobutyl; only one of the "R"s is substituted with the group expressed by the formula (9); white solid)
Si-8: "AEROSIL 200™" (hydrophilic type) (manufactured by Aerosil Nippon Co., Ltd.)
Si-9: "AEROSIL R972™" (hydrophobic type) (manufactured by Aerosil Nippon Co., Ltd.)
P-1: phosphorus flame retardant, "CR-741" (manufactured by Daihachi Chemical Industry Co., Ltd.)
P-2: phosphorus flame retardant, "CR-747" (manufactured by Daihachi Chemical Industry Co., Ltd.)
N-1: melem (manufactured by Nissan chemical Industries Ltd.)
N-2: mellon (manufactured by Nissan chemical Industries Ltd.)

Examples 40 to 46 show that a small amount of silicon such as 1 part by weight is sufficient to improve the flame retardancy to a high rate V-0. Especially, silicon containing an amino group or epoxy group is preferred. When the silicon was added together with a cyclic nitrogen compound such as melem or mellon, the flame retardancy was drastically improved.

Examples 44 to 48 and 53 to 55 show that excellent flame retardancy and dart impact resistance are achieved by adding ZnO or the like to the composition.

Examples 47 and 48 show that polyhedral oligomeric silsesquioxane containing amino groups is effective to exhibit excellent flame retardancy as well as silicon, and that in the case of polyhedral oligomeric silsesquioxane not containing amino groups, an excellent flame retardancy can be achieved by using the polyhedral oligomeric silsesquioxane together with melem as a cyclic nitrogen compound. It was confirmed by analyzing the composition obtained in Example 47 with $^1$H-NMR that polyhedral oligomeric silsesquioxane added to the composition quantitatively existed in the composition and was not decomposed.

Examples 49 and 50 show that excellent flame retardancy was achieved by adding a small amount of fumed silica (a porous silica) to the composition.

Example 51 shows that a phosphoric ester flame retardant is also effective.

As explained above, in the present invention, silicon compounds and phosphorus flame retardants give the composition excellent heat resistance and impact resistance as well as flame retardancy even though a very small amount thereof is added to the composition.

EXAMPLES 57 TO 59

Pellets were prepared in substantially the same manner as in Example 1 except that each component was used at the ratio shown in Table 5. Using the pellets, sheets were molded in the above-mentioned manner. The temperature of the surface of the roll was adjusted at 130° C. Continuous molding could be conducted steadily. An unsuitable mass was not substantially observed at the T-die. Physical properties of the sheets were evaluated in the above-described manner. The results are shown in Table 5. In the table, "HIPS" and "GF" indicates high impact polystyrene ("H9405", manufactured by A & M Styrene Co., Ltd.,) and glass fibers ("Microglass RES03-TP30", manufactured by NGF Company), respectively, and P-1 and P-2 are as defined in Examples 40 to 56.

COMPARATIVE EXAMPLE 7

Pellets were prepared in substantially the same manner as in Example 57 except that LCP was not added. Using the pellets, a sheet was molded in the above-described manner. However, a sheet was not molded under the same condition as in Example 57 owing to an excessive load of torque on the extruder.

COMPARATIVE EXAMPLE 8

Sheet molding was conducted in substantially the same manner as in Example 57 except that 100 parts by weight of modified polyphenylene ether ("Xyron X9102", manufactured by Asahi Kasei Corp.), a so-called heat resistant grade, was used. However, an unsuitable mass was observed at the T-die. Physical properties of the sheets were evaluated in the above-described manner. The results are shown in Table 5.

Table 5 shows that the composition of the present invention exhibits an excellent sheet moldability and high productivity due to a smaller amount of unsuitable mass, and also that the sheets prepared using the composition of the present invention have excellent physical properties, i.e., good balance in flame retardancy, thickness evenness, dielectric breakdown strength, heat shrinkage rate and tensile strength.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Composition | | | | | | | | | |
| (A) | PPE-1 | 95 | | | 47.5 | | | 90 | 83 |
| | PPE-2 | | 95 | | | | | | |
| | PPE-3 | | | 93 | 47.5 | | | | |
| | PPE-4 | | | | | 90 | | | |
| | PPE-5 | | | | | | 80 | | |
| | PPE-6 | | | | | | | | |
| | PPE-7 | | | | | | | | |
| | PPE-8 | | | | | | | | |
| | HIPS | | | | | | | 5 | 12 |
| (B) | LCP-1 | 5 | 5 | 7 | 5 | 5 | | | 5 |
| | LCP-2 | | | | | 5 | 10 | | |
| | LCP-3 | | | | | | 10 | 5 | |
| | GF | | | | | | 5 | | |
| Content of polymer with Mw of 20,000 or less (%) | | 16.6 | 19.1 | 10.1 | 13.2 | 21.7 | 25.4 | 16.7 | 16.7 |
| Mw/Mn | | 2.38 | 2.56 | 2.23 | 2.29 | 2.84 | 3.36 | 2.39 | 2.38 |
| Physical Properties | | | | | | | | | |
| Impact resistance | Izod (J) | 41 | 35 | 82 | 55 | 64 | 70 | 59 | 122 |
| Chemical resistance | Retention of TS (%) | 95 | 88 | 100 | 100 | 85 | 91 | 82 | 85 |
| Fluidity | SSP (MPa) | 9.6 | 10 | 6.8 | 8.5 | 5.0 | 7.8 | 9.2 | 8.8 |
| Heat resistance | DTUL (° C.) | 185 | 184 | 183 | 186 | 182 | 185 | 181 | 167 |
| Flame retardancy | Average combustion time (sec) | 8.0 | 8.5 | 7.8 | 9.5 | 13.5 | 11.3 | 10.5 | 18.5 |
| | Dropping | ○ | ○ | ○ | ○ | ○ | ○ | ○ | ○ |

| | | Ex. 9 | Ex. 10 | Ex. 11 | Comp. Ex. 1 | Comp. Ex. 2 | Comp. Ex. 3 | Comp. Ex. 4 |
|---|---|---|---|---|---|---|---|---|
| Composition | | | | | | | | |
| (A) | PPE-1 | 93 | | 90 | | | | 100 |
| | PPE-2 | | | | | | | |
| | PPE-3 | | | 5 | | | | |
| | PPE-4 | | | | | | | |
| | PPE-5 | | 70 | | | | | |
| | PPE-6 | | | | 95 | | | |
| | PPE-7 | | | | | 95 | | |
| | PPE-8 | | | | | | 95 | |

TABLE 1-continued

|  |  |  |  |  |  |  |  |  |
|---|---|---|---|---|---|---|---|---|
| (B) | HIPS | | | | | | | |
|  | LCP-1 | 5 |  | 2.5 | 5 | 5 | 5 |  |
|  | LCP-2 |  | 15 | 2.5 |  |  |  |  |
|  | LCP-3 |  | 15 |  |  |  |  |  |
|  | GF | 2 | 20 |  |  |  |  |  |
| Content of polymer with Mw of 20,000 or less (%) |  | 16.4 | 23.3 | 16.5 | 4.2 | 31.1 | 34.8 | 15.5 |
| Mw/Mn |  | 2.37 | 3.29 | 2.33 | 2.11 | 3.12 | 3.60 | 2.42 |
| Physical Properties |  | | | | | | | |
| Impact resistance | Izod (J) | 56 | 68 | 34 | 52 | 12 | 10 | 19 |
| Chemical resistance | Retention of TS (%) | 98 | 95 | 95 | 98 | X | X | 73 |
| Fluidity | SSP (MPa) | 6.2 | 4.9 | 7.4 | >13 | 6.0 | 5.4 | >13 |
| Heat resistance | DTUL (° C.) | 186 | 188 | 182 | 185 | 184 | 183 | 185 |
| Flame retardancy | Average combustion time (sec) | 8.3 | 8.7 | 9.9 | 12.1 | 15.4 | 18.8 | 11.1 |
|  | Dropping | ○ | ○ | ○ | ○ | ○ | X | ○ |

TABLE 2

|  |  | Ex. 12 | Comp. Ex. 5 | Comp. Ex. 6 | Ex. 13 |
|---|---|---|---|---|---|
| Composition | | | | | |
| (A) | PPE-3 | 95 | 95 | 95 | 95 |
| (B) | LCP-1 | 5 | 5 | 5 | 5 |
| $\alpha (= D^3 \times N/Q \times 10^{-4})$ | | 32 | 62 | 32 | 33 |
| Screw rotation speed (N) (rpm) | | 300 | 300 | 900 | 600 |
| Resin temperature (° C.) | | 351 | 350 | 386 | 368 |
| Content of polymer with Mw of 20,000 or less (%) | | 11.6 | 8.6 | 11.8 | 10.5 |
| Mw/Mn | after heating | 2.54 | 2.56 | 3.66 | 2.25 |
| Physical Properties | | | | | |
| Impact resistance | Izod (J) | 73 | 58 | 23 | 75 |
| Chemical resistance | Retention of TS (%) | 100 | 98 | 42 | 100 |
| Fluidity | SSP (MPa) | 11.9 | >13 | >13 | 6.2 |
| Heat resistance | DTUL (° C.) | 185 | 184 | 183 | 184 |
| Flame retardancy | Average combustion time (sec) | 11.2 | 13.3 | 15.6 | 8.9 |
|  | Dropping | ○ | ○ | ○ | ○ |

TABLE 3-1

|  |  | Ex. 1 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|---|---|---|---|---|
| Composition | | | | | | | | | | | | | | | |
| (A) | PPE-1 | 95 | 95 | 95 | 95 | 95 | 95 | 95 | 95 | 95 | 95 | 95 | 95 | 95 | 95 |
| (B) | LCP-1 | 5 | 5 | 5 | 5 | 5 | 5 | 5 | 5 | 5 | 5 | 5 | 5 | 5 | 5 |
| (D) | Elastomer-1 | | | | | | | | | | | | 1 | 1 | 1 |
|  | Elastomer-2 | | | | | | | | | | | | | | |
|  | Elastomer-3 | | | | | | | | | | | | | | |
|  | Elastomer-4 | | | | | | | | | | | | | | |
|  | Elastomer-5 | | | | | | | | | | | | | | |
| (C) Compound containing metal element | ZnO | 0.0 | 0.3 | 0.4 | 0.8 | 5.0 | 15.0 | | | | | | 0.8 | 0.2 | 0.0 |
|  | Mg(OH)$_2$ | | | | | | | 0.8 | | | | | | | |
|  | Ti(iOPr)$_4$ | | | | | | | | 0.8 | | | | | | |
|  | Zn(OAc)$_2$ | | | | | | | | | 0.8 | | | | | |
|  | ZnSt$_2$ | | | | | | | | | | 0.8 | | | | |
|  | ZnS | | | | | | | | | | | 0.8 | | | |
|  | Cu$_2$O | | | | | | | | | | | | | | |
|  | Al$_2$O$_3$ | | | | | | | | | | | | | | |
| Abundance ratio of Zn and/or Mg (when Rm = 0) | R (Rd) in dispersed phase | 0 | 0.0033 | 0.0052 | 0.125 | 0.0076 | | | | | | | 0.0067 | | |
|  | R (Rm) in continuous phase | 0 | 0 | 0.0002 | 0.0007 | 0 | | | | | | | 0.0002 | | |
|  | Rd > Rm | X | ○ | — | — | ○ | | | | | | | ○ | | |

TABLE 3-1-continued

|  |  | Ex. 1 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|---|---|---|---|---|
| (when Rm ≠ 0) | 150 Rm > Rd > Rm | — |  | — | ○ | X | — |  |  |  |  |  | — |  |  |
| Physical Properties |  |  |  |  |  |  |  |  |  |  |  |  |  |  |  |
| Impact resistance | Dart impact (J) | 7.4 | 8.2 | 36 | 24 | 35 | 16 | 46 | 42 | 20 | 32 | 9.2 | 56 | 30 | 6.9 |
|  | Ductile fracture | X | X | Δ | ○ | ○ | X | ○ | ○ | Δ | Δ | X | ○ | Δ | X |
| Heat resistance | Heat distortion temperature (° C.) | 185 | 184 | 184 | 183 | 183 | 183 | 182 | 184 | 183 |  |  | 182 |  | 184 |
| Tensile properties | Breaking extension (%) | 15 | 23 | 65 | 66 | 72 | 16 | 48 | 38 | 13 |  |  | 62 |  | 14 |
| Flame retardancy | Average combustion time (sec) | 8.0 | 10.2 | 8.7 | 10.6 | 16.6 | 23 | 11.3 | 12.3 | 7.0 |  |  | 11.6 |  | 9.2 |
|  | Dropping | ○ | ○ | ○ | ○ | ○ | X | ○ | ○ | ○ |  |  | ○ |  | ○ |

TABLE 3-2

|  |  | Ex. 27 | Ex. 28 | Ex. 29 | Ex. 30 | Ex. 31 | Ex. 32 | Ex. 33 | Ex. 34 | Ex. 35 | Ex. 36 | Ex. 37 | Ex. 38 | Ex. 39 |
|---|---|---|---|---|---|---|---|---|---|---|---|---|---|---|
| Composition |  |  |  |  |  |  |  |  |  |  |  |  |  |  |
| (A) | PPE-1 | 95 | 95 | 95 | 95 | 95 | 95 | 95 | 95 | 95 | 95 | 95 | 95 | 95 |
| (B) | LCP-1 | 5 | 5 | 5 | 5 | 5 | 5 | 5 | 5 | 5 | 5 | 5 | 5 | 5 |
| (D) | Elastomer-1 |  |  |  |  |  |  |  |  | 1 | 1 | 1 | 5 | 5 |
|  | Elastomer-2 | 1 | 1 |  |  |  |  |  |  |  |  |  |  |  |
|  | Elastomer-3 |  |  | 1 | 1 |  |  |  |  |  |  |  |  |  |
|  | Elastomer-4 |  |  |  |  | 1 | 1 |  |  |  |  |  |  |  |
|  | Elastomer-5 |  |  |  |  |  |  | 1 | 1 |  |  |  |  |  |
| (C) Compound containing metal element | ZnO | 0.8 | 0.0 | 0.8 | 0.0 | 0.8 | 0.0 | 0.8 | 0.0 |  |  |  | 0.8 | 0.0 |
|  | Mg(OH)$_2$ |  |  |  |  |  |  |  |  | 0.8 |  |  |  |  |
|  | Ti(iOPr)$_4$ |  |  |  |  |  |  |  |  |  |  |  |  |  |
|  | Zn(OAc)$_2$ |  |  |  |  |  |  |  |  |  |  |  |  |  |
|  | ZnSt$_2$ |  |  |  |  |  |  |  |  |  |  |  |  |  |
|  | ZnS |  |  |  |  |  |  |  |  |  |  |  |  |  |
|  | Cu$_2$O |  |  |  |  |  |  |  |  |  | 0.8 |  |  |  |
|  | Al$_2$O$_3$ |  |  |  |  |  |  |  |  |  |  | 0.8 |  |  |
| Abundance ratio of Zn and/or Mg | R (Rd) in dispersed phase |  |  |  |  |  |  |  |  |  |  |  |  |  |
|  | R (Rm) in continuous phase |  |  |  |  |  |  |  |  |  |  |  |  |  |
| (when Rm = 0) | Rd > Rm |  |  |  |  |  |  |  |  |  |  |  |  |  |
| (when Rm ≠ 0) | 150 Rm > Rd > Rm |  |  |  |  |  |  |  |  |  |  |  |  |  |
| Physical Properties |  |  |  |  |  |  |  |  |  |  |  |  |  |  |
| Impact resistance | Dart impact (J) | 53 | 7.2 | 53 | 13 | 51 | 12 | 47 | 8 | 50 | 5.4 | 9.8 | 51 | 9.2 |
|  | Ductile fracture | ○ | X | ○ | Δ | ○ | X | ○ | X | ○ | X | X | ○ | X |
| Heat resistance | Heat distortion temperature (° C.) |  |  |  |  |  |  |  |  |  |  |  | 178 | 180 |
| Tensile properties | Breaking extension (%) |  |  |  |  |  |  |  |  |  |  |  | 60 | 47 |
| Flame retardancy | Average combustion time (sec) |  |  |  |  |  |  |  |  |  |  |  | 16 | 8.2 |
|  | Dropping |  |  |  |  |  |  |  |  |  |  |  | ○ | ○ |

TABLE 4

|  |  | Ex. 40 | Ex. 41 | Ex. 42 | Ex. 43 | Ex. 44 | Ex. 45 | Ex. 46 | Ex. 47 | Ex. 48 |
|---|---|---|---|---|---|---|---|---|---|---|
| Composition |  |  |  |  |  |  |  |  |  |  |
| (A) | PPE-1 | 95 | 95 | 95 | 95 | 95 | 95 | 95 | 95 | 95 |
| (B) | LCP-1 | 5 | 5 | 5 | 5 | 5 | 5 | 5 | 5 | 5 |
| (C) | ZnO |  |  |  |  | 0.8 | 0.8 | 0.8 | 0.8 | 0.8 |
| (E) | Si-1 | 1.00 |  |  |  |  |  |  |  |  |
|  | Si-2 |  | 1.00 |  |  |  |  |  |  |  |
|  | Si-3 |  |  | 1.00 |  |  |  |  |  |  |

TABLE 4-continued

|  |  |  |  |  |  |  |  |  |  |  |
|---|---|---|---|---|---|---|---|---|---|---|
|  | Si-4 |  |  |  | 1.00 |  |  |  |  |  |
|  | Si-5 |  |  |  |  | 1.00 | 1.00 | 1.00 |  |  |
|  | Si-6 |  |  |  |  |  |  |  | 1.00 |  |
|  | Si-7 |  |  |  |  |  |  |  |  | 2.00 |
|  | Si-8 |  |  |  |  |  |  |  |  |  |
|  | Si-9 |  |  |  |  |  |  |  |  |  |
|  | P-1 |  |  |  |  |  |  |  |  |  |
| (G) | N-1 |  |  |  |  |  | 1.00 |  | 1.00 |  |
|  | N-2 |  |  |  |  |  |  | 1.00 |  |  |
| Physical Properties |  |  |  |  |  |  |  |  |  |  |
| Flame retardance | Average combustion time (sec) | 4.0 | 2.3 | 4.8 | 13.0 | 5.0 | 2.2 | 2.0 | 4.4 | 5.0 |
|  | Maxium combustion time (sec) | 7.0 | 4.5 | 7.5 | 28.2 | 17.9 | 4.0 | 4.0 | 9.8 | 7.1 |
|  | UL | V-0 | V-0 | V-0 | V-1 | V-1 | V-0 | V-0 | V-0 | V-0 |
|  | 5V | ○ | ○ |  | X | ○ | ○ | ○ |  |  |
| Impact resistance | Dart impact (J) | — | — | — | — | 41 | 34.3 | 35.2 | 5.8 | 21 |
|  | Ductile fracture | — | — | — | — | ○ | ○ | ○ | X | Δ |
| Heat resistance | Heat distortion temperature (° C.) | 183 | 182 | 184 | 185 | 182 | 183 | 184 | 183 | 180 |
| Tensile properties | Breaking extension (%) | 15 | 14 | 16 | 38 | 64 | 44 | 40 | 15 | 44 |

|  |  | Ex. 49 | Ex. 50 | Ex. 51 | Ex. 52 | Ex. 53 | Ex. 54 | Ex. 55 | Ex. 56 |
|---|---|---|---|---|---|---|---|---|---|
| Composition |  |  |  |  |  |  |  |  |  |
| (A) | PPE-1 | 95 | 95 | 95 | 95 | 95 | 95 | 95 | 95 |
| (B) | LCP-1 | 5 | 5 | 5 | 5 | 5 | 5 | 5 | 5 |
| (C) | ZnO |  |  |  |  | 0.8 | 0.8 | 0.8 | 0.8 |
| (E) | Si-1 |  |  |  |  |  |  |  |  |
|  | Si-2 |  |  |  | 0.5 | 0.5 | 1.0 | 2.0 |  |
|  | Si-3 |  |  |  |  |  |  |  |  |
|  | Si-4 |  |  |  |  |  |  |  |  |
|  | Si-5 |  |  |  |  |  |  |  |  |
|  | Si-6 |  |  |  |  |  |  |  |  |
|  | Si-7 |  |  |  |  |  |  |  |  |
|  | Si-8 | 1.00 |  |  |  |  |  |  |  |
|  | Si-9 |  | 1.00 |  |  |  |  |  |  |
|  | P-1 |  |  | 3.00 |  |  |  |  | 2.0 |
| (G) | N-1 | 1.00 | 1.00 |  |  |  |  |  |  |
|  | N-2 |  |  |  |  |  |  |  |  |
| Physical Properties |  |  |  |  |  |  |  |  |  |
| Flame retardance | Average combustion time (sec) | 4.2 | 2.6 | 4.4 | 2.0 | 3.1 | 1.2 | 0.7 | 4.8 |
|  | Maxium combustion time (sec) | 9.1 | 5.0 | 10.0 | 4.5 | 7.5 | 4.0 | 1.5 | 12.0 |
|  | UL | V-0 | V-0 | V-0 | V-0 | V-0 | V-0 | V-0 | V-1 |
|  | 5V |  |  |  | ○ |  | ○ |  |  |
| Impact resistance | Dart impact (J) | — | — | — | 4.2 | 30 | 35 | 51 | 45.3 |
|  | Ductile fracture | — | — | — | X | Δ | ○ | ○ | ○ |
| Heat resistance | Heat distortion temperature (° C.) | 184 | 184 | 174 | 183 | 182 | 181 | 180 | 176 |
| Tensile properties | Breaking extension (%) | 15 | 45 | 13 | 11 | 20 | 31 | 26 | 42 |

TABLE 5

|  |  | Ex. 57 | Ex. 58 | Ex. 59 | Comp. Ex. 7 | Comp. Ex. 8 |
|---|---|---|---|---|---|---|
| Composition |  |  |  |  |  |  |
| (A) | PPE-1 | 95 | 95 | 95 | 100 |  |
|  | HIPS |  |  | 2 |  |  |
| (B) | LCP-1 | 5 | 5 | 3 |  |  |
| (E) | P-1 |  | 3 |  |  |  |
|  | P-2 |  |  |  |  | 5 |

TABLE 5-continued

|  |  |  | Ex. 57 | Ex. 58 | Ex. 59 | Comp. Ex. 7 | Comp. Ex. 8 |
|---|---|---|---|---|---|---|---|
| X9102 |  |  |  |  |  |  | 100 |
| Molding |  |  |  |  |  |  |  |
| Sheet moldability |  |  | ○ | ○ | ○ | X | Δ |
| Unsuitable mass |  |  | ○ | ○ | ○ | — | X |
| Physical Properties of Sheet |  |  |  |  |  |  |  |
| Flame retardancy | MD | Maximum combustion time (sec) | 15 | 9 | 7 | — | * |
|  |  | Total combustion time (sec) | 59 | 48 | 45 | — | * |
|  |  | UL file standard | VTM-1 | VTM-0 | VTM-0 | — | X |
|  | TD | Maxium combustion time (sec) | 11 | 5 | 6 | — | * |
|  |  | Total combustion time (sec) | 59 | 31 | 28 | — | * |
|  |  | UL film standard | VTM-1 | VTM-0 | VTM-0 | — | X |
| Evenness of thickness | Dt | (%) | 0.80 | 0.16 | 0.13 | — | 5.20 |
| Dielectric breakdown strength |  | (kV/mm) | 60.3 | 67.0 | 75.1 | — | 59.0 |
| Heat shrinkage rate | MD |  | 0.15 | 0.30 | 0.15 | — | 0.40 |
|  | TD |  | 0.20 | 0.20 | 0.20 | — | 0.30 |
| Tensile properties TS (MPa) | MD | (at 23° C.) | 78 | 75 | 78 | — | 72 |
|  |  | (at 150° C.) | 42 | 41 | 38 | — | 31 |
|  | Td | (at 23° C.) | 58 | 73 | 65 | — | 46 |
|  |  | (at 150° C.) | 28.0 | 38.0 | 40.0 | — | 24.0 |

What is claimed is:

1. A resin composition comprising:
   (A) 70 to 99 parts by weight of a polyphenylene ether resin, and
   (B) 1 to 30 parts by weight of a liquid-crystal polyester, wherein the polyphenylene ether resin in the composition contains 10 to 30 wt. % of polymer having a molecular weight of 20,000 or less and has a molecular weight distribution (Mw/Mn) of 1.8 to 3.5.

2. The resin composition according to claim 1, wherein the polyphenylene ether resin contains 10 to 25 wt. % of polymer having a molecular weight of 20,000 or less, and has a molecular weight distribution (Mw/Mn) of 2.0 to 3.0.

3. The resin composition according to claim 1, further comprising:
   (C) 0.1 to 10 parts by weight of a compound containing a monovalent, divalent, trivalent or tetravalent metal element based on 100 parts by weight, in total, of components (A) and (B).

4. The resin composition according to claim 3, wherein the monovalent, divalent, trivalent or tetravalent metal element is at least one element selected from the group consisting of Zn, Mg, Ti, Sn, Sb, Al and Ge.

5. The resin composition according to claim 3, wherein component (C) is at least one compound selected from the group consisting of ZnO, zinc acetate, zinc stearate, $Mg(OH)_2$, tetrabutoxide titanate and tetraisopropoxy titanate.

6. A resin composition comprising:
   (A) 70 to 99 parts by weight of a polyphenylene ether resin;
   (B) 1 to 30 parts by weight of a liquid-crystal polyester, wherein the polyphenylene ether resin in the composition contains 10 to 30 wt. % of polymer having a molecular weight of 20,000 or less and has a molecular weight distribution (Mw/Mn) of 1.8 to 3.5;
   (C) 0.1 to 10 parts y weight of a compound containing a monovalent, divalent, trivalent or tetravalent metal element based on 100 parts by weight, in total, of components (A) and (B);
   wherein the composition has a morphology comprising a continuous phase and a disperse phase, in which the abundance ratio (R) of Zn and/or Mg in the disperse phase obtained by TEM-EDX is 0.0005 or more and a requirement of Rd>Rm when Rm=0 or 150 Rm>Rd>Rm when Rm≠0 (wherein the abundance ratio (R) of Zn and/or Mg=(the number of Lα-rays of Zn and/or Mg)/(the number of Kα-rays of C), Rd represents R in the disperse phase, and Rm represents R in the continuous phase) is satisfied.

7. The resin composition according to any one of claims 1 to 5, further comprising:
   (D) 0.05 to 30 parts by weight of a vinyl compound elastomer based on 100 parts by weight, in total, of components (A) and (B).

8. The resin composition according to claim 7, wherein component (D) is functionalized with an acid anhydride group.

9. The resin composition according to any one of claims 1 to 5, further comprising:
   (E) 0.1 to 10 parts by weight of a flame retardant based on 100 parts by weight, in total, of components (A) and (B).

10. The resin composition according to claim 9, wherein component (E) is (F) a silicon compound.

11. The resin composition according to claim 10, wherein component (F) is a silicone.

12. The resin composition according to claim 10, wherein component (F) is a polyhedral oligomeric silsesquioxane or partially opened polyhedral oligomeric silsesquioxane.

13. The resin composition according to claim 10, wherein component (F) is a silica.

14. The resin composition according to any one of claims 10 to 13, further comprising:
   (G) a cyclic nitrogen compound,
   wherein the weight ratio (f/g) of component (F) to component (G) is 0.1 to 10.

15. The resin composition according to claim 14, wherein component (G) is a melamine, melem or mellon.

16. The resin composition according to claim 9, wherein component (E) is a phosphorus flame retardant.

17. The resin composition according to claim 16, wherein the phosphorus flame retardant has the following structure (1):

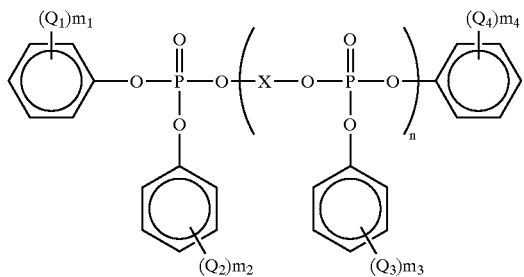

wherein $Q_1$, $Q_2$, $Q_3$ and $Q_4$ each independently represents an alkyl group having 1 to 6 carbon atoms or a hydrogen atom; n represents an integer of 1 or more; $m_1$, $m_2$, $m_3$ and $m_4$ each independently represents an integer of 0 to 3; and X is selected from formula (2):

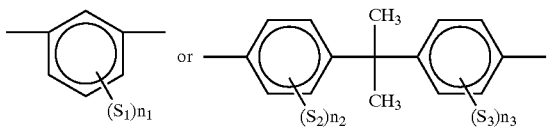

wherein $S_1$, $S_2$ and $S_3$ each independently represents a methyl group or a hydrogen atom; and $n_1$, $n_2$ and $n_3$ each independently represents an integer of 0 to 2.

18. A molded article obtained by molding the resin composition according to any one of claims 1 to 5, 8 and 10 to 17.

19. The molded article according to claim 18, wherein the molded article is a heat resistant part for automobiles or office machines.

20. The molded article according to claim 18, wherein the molded article is a sheet.

21. A method for producing the composition according to claim 1 or 2 comprising:

providing a twin-screw extruder, and melt-kneading a resin with the twin-screw extruder set at a screw rotation speed (N) of 200 to 600 rpm, heat exposure ($\alpha$) of 50 or less and a temperature of the resin extruded from a die of 310 to 380° C. (wherein heat exposure ($\alpha$)=$D^3 \times N/Q \times 10^{-4}$; D (mm)=diameter of the screw of the twin-screw extruder; N (rpm)=screw rotation speed; and Q (kg/hr)=extrusion rate of the resin from the extruder).

22. A resin composition comprising:

(A) 70 to 99 parts by weight of a polyphenylene ether resin, (B) 1 to 30 parts by weight of a liquid-crystal polyester, and 0.1 to 10 parts by weight of Zn and/or Mg based on 100 parts by weight, in total, of components (A) and (B);

wherein the abundance ratio (R) of Zn and/or Mg in the disperse phase obtained by TEM-EDX is 0.0005 or more, and a requirement of Rd>Rm when Rm=0 or 150 Rm>Rd>Rm when Rm≠0 (wherein the abundance ratio (R) of Zn and/or Mg=(the number of L$\alpha$-rays of Zn and/or Mg)/(the number of K$\alpha$-rays of C), Rd represents R in the disperse phase, and Rm represents R in the continuous phase) is satisfied.

* * * * *